(12) United States Patent
Weis

(10) Patent No.: US 7,991,836 B2
(45) Date of Patent: *Aug. 2, 2011

(54) APPROACH FOR MANAGING STATE INFORMATION BY A GROUP OF SERVERS THAT SERVICES A GROUP OF CLIENTS

(75) Inventor: Brian Weis, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/868,675

(22) Filed: Aug. 25, 2010

(65) Prior Publication Data

US 2010/0318605 A1 Dec. 16, 2010

Related U.S. Application Data

(63) Continuation of application No. 11/183,278, filed on Jul. 14, 2005, now Pat. No. 7,827,262.

(51) Int. Cl.
*G06F 15/16* (2006.01)
*G06F 15/173* (2006.01)

(52) U.S. Cl. .......................... 709/203; 709/223; 709/224

(58) Field of Classification Search ........................ None
See application file for complete search history.

(56) References Cited

U.S. PATENT DOCUMENTS

| | | | |
|---|---|---|---|
| 5,634,011 | A | 5/1997 | Auerbach et al. |
| 5,799,305 | A | 8/1998 | Bortvedt et al. |
| 6,625,750 | B1 | 9/2003 | Duso et al. |
| 6,785,809 | B1 | 8/2004 | Hardjono |
| 6,915,445 | B2 | 7/2005 | Navar et al. |
| 6,993,587 | B1 | 1/2006 | Basani et al. |
| 7,159,234 | B1 | 1/2007 | Murphy et al. |
| 2004/0153709 | A1 | 8/2004 | Burton-Krahn |

OTHER PUBLICATIONS

Hugh Harney, "Secure Multicast for Large Groups" http://www.securemulticast.org/smug-meetings-page2.htm, Mar. 21, 2001.
M. Baugher, et al., "The Group Domain Of Interpretation", Network Working Group Request for Comments: 3547, Jul. 2003.
S. Kent, et al., "Security Architecture for the Internet Protocol", Network Working Group Request for Comments: 2401, Nov. 1998.
C. Madson, et al., "The Use of HMAC-SHA-1-96 within ESP and AH", Network Working Group Request for Comments: 2404, Nov. 1998.
S. Kent, et al., "IP Encapsulating Security Payload (ESP)", Network Working Group Request for Comments: 2406, Nov. 1998. D. Waller, et al., "Key Management for Multicast: Issues and Architectures", Network Working Group Request for Comments: 2627, Jun. 1999.
D. Harkins, et al., "The Internet Key Exchange (IKE)", Network Working Group Request for Comments: 2409, Nov. 1998.
J. Kohl, et al., "The Kerberos Network Authentication Service (V5)", Network Working Group Request for Comments: 1510, Sep. 1993.

*Primary Examiner* — John B. Walsh
(74) *Attorney, Agent, or Firm* — Hickman Palermo Truong & Becker LLP; Eric L. Sutton

(57) ABSTRACT

An approach for managing state information by a group of servers that services a group of clients is disclosed. One server is designated as the primary server and is responsible for generating state information to be used by both the servers and the clients. The remaining servers are designated as secondary servers that help to manage the group, but which do not generate the state information. When the primary server fails or is not available due to a network partition event, one of the secondary servers changes role to become the primary server. With a network partition event, each partition can have a primary server, and when the network partition heals, one of the primary servers changes role back to being a secondary server. As a result, the group of servers maintains a consistent set of state information without being vulnerable to the single failure of a server.

12 Claims, 14 Drawing Sheets

APPROACH FOR MANAGING STATE INFORMATION BY A GROUP OF SERVERS THAT SERVICES A GROUP OF CLIENTS

CROSS-REFERENCE TO RELATED APPLICATIONS; BENEFIT CLAIM

This application claims benefit as a continuation of application Ser. No. 11/183,278, filed Jul. 14, 2005, now U.S. Pat. No. 7,827,262 the entire contents of which is hereby incorporated by reference as if fully set forth herein, under 35 U.S.C. §120. The applicant hereby rescinds any disclaimer of claim scope in the parent application or the prosecution history thereof and advises the USPTO that the claims in this application may be broader or otherwise of a different scope than any claim in the parent application.

FIELD OF THE INVENTION

The present invention generally relates to managing state information for a group of devices, and more specifically, to managing state information by a group of servers that services a group of clients.

BACKGROUND

The approaches described in this section are approaches that could be pursued, but not necessarily approaches that have been previously conceived or pursued. Therefore, unless otherwise indicated, the approaches described in this section are not prior art to the claims in this application and are not admitted to be prior art by inclusion in this section.

For large organizations, there are often a number of separate and geographically dispersed sites that the organization wants to connect through a network. For example, a company may have manufacturing sites, development sites, distribution sites, and a number of sales locations that are located throughout a region, country, or the world. The company wants to interconnect the sites via a network so that the sites can share information and personnel spread out among the sites can communicate with each other. A typical solution is for the company to establish a network among the sites or to purchase network service from a service provider with multi-protocol label switching (MPLS) capability that interconnects the company's various sites together in a private network. Because the company typically wants each site to be able to communicate with any other site, such a network arrangement is described as an "any to any" solution that allows any site to send packets across the private network to any other site.

In such a network of geographically dispersed locations, the organization generally wants to add confidentiality to the communications between the sites, such as by using one or more cryptographic techniques to encrypt and decrypt the network traffic between the sites. For example, a group key management system, such as the group domain of interpretation (GDOI) protocol defined in RFC 3547, can be used to provide cryptographic keys and policy to a group of devices in the network. As a specific example, Internet Protocol Security (IPsec) defined in RFCs 2401, 2404, and 2406 can be used to provide security associations (SAs) that define the cryptographic keys and encryption methods to be used for communications between the sites. The communications between sites can be just between two particular sites or between any number of sites, such as in the form of secure multicasts among the virtual private network (VPN) gateways that interconnect each site to the network.

FIG. 1 is a block diagram that depicts a set of sites 110, 112, and 114 and a key server 120 that are interconnected through a network 100 and a group key management system. For example, the GDOI group key management protocol can be used. For communications involving multiple sites, a group can be formed to include the participating sites. For example, in FIG. 1, sites 110, 112, and 114 can participate in a secure multicast, and therefore, sites 110, 112, and 114 are referred to as the group members.

Key server 120 is responsible for generating group keys and group policy, such as by establishing SAs based on IPsec. Each of sites 110, 112, and 114 registers with key server 120 using the group key management protocol and by providing the required authentication information. Then sites 110, 112, and 114 receive the current security association, denoted in FIG. 1 as SA-1, with the current IPsec keys and policy from key server 120, as depicted by arrows 130, 132, and 134. As a result, sites 110, 112, and 114 can securely communicate with each other based on SA-1.

Because SAs are set to expire after a specified amount of time or need to be replaced if a member of the group leaves, key server 120 periodically pushes updates to the group policy in the form of new SAs, such as SA-2 and SA-3 depicted in FIG. 1. As a specific example, key server 120 sends rekey messages to sites 110, 112, and 114 that transmit the new SA to be used by sites 110, 112, and 114, as depicted by arrows 130, 132, and 134.

One problem with using a single group server, such as key server 120 in FIG. 1, is that the single group server represents a single point of failure for communications among the members of the group. For example, if key server 120 fails, sites 110, 112, and 114 will not receive new group keys when the current SAs expire or when a member leaves the group that would typically require generation and distribution of a new SA to preclude the leaving member from being able to read the communications for the group.

One approach for addressing the single point of failure problem when using a single key server is to use multiple independent key servers. However, if one group member registers with key server A and another group member registers with key server B, the two group members will receive different SAs. As a result, group members registering with different key servers cannot communicate with each other. Instead, only group members that register with the same key server can communicate using the SAs from that key server.

Another approach for addressing the single point of failure problem is to employ multiple groups with each group having a single key server. In order for members of the different groups to communicate, the group members must register with each key server of each group to receive the SA for each group. By having the SA from each key server, any group member can communicate with any other group member using one of the SAs. However, as the number of groups increases, the number of SAs that must be obtained and maintained by each group member increases, which represents a significant scaling problem for a large number of sites that are served by many key servers. For example, in some implementations, the number of sites can number in the hundreds or even thousands, and there can be dozens of key servers that each group member must register with and obtain the different SAs. Thereafter, while each group member has all the different SAs, each group member must identify which SA is being used for each group communication.

Another problem with multiple groups having different key servers is that network partitions can occur, resulting in some group members being unable to communicate with some key servers. A network partition occurs when network interconnections are unavailable resulting in the members of one group being unable to communicate with the key server for another group and possibly some members of the other group.

For example, if a network partition occurs, members of group A are unable to communicate with the key server for group B while members of group B cannot communicate with the key server for group A. Even if the individual members of groups A and B can communicate (even though the members of group A cannot communicate with the key server for group B and vice versa), then as new SAs are generated by each group's key server, the members of the different groups will not share the same SA, and therefore will be unable to communicate with each other.

Yet another approach for addressing the single point of failure problem is to employ a hierarchical arrangement of key servers, such as with the Kerberos authentication system that employs a number of key distribution centers (KDCs). With Kerberos, one KDC is specified to be the master server that maintains and modifies a database of key information. The remaining KDCs are the slave servers, each of which includes a read-only copy of the database from the master server.

Having multiple slave key servers with the hierarchical approach addresses the single failure problem if another slave server fails, since other slave servers can be used to obtain the keys from the database. However, the Kerberos approach is still susceptible to a single failure of the master key server, since the slave key servers are unable to create new objects or to modify current objects in their copies of the database from the master server.

Still another approach for addressing the single point of failure problem is to use a distributed database that allows the same copy of the database to be stored on multiple servers. Each database server acts a master that can update the copy of the database stored on that database server. However, to ensure consistency across the multiple copies of the database, changes to each object in the database must be tracked so that the changes to each object can be applied to all copies of the database in a consistent manner.

A distributed database is not susceptible to a single point of failure since any copy of the database is considered to be a master copy. However, ensuring consistency among multiple changes the objects within the distributed database by the multiple masters requires significantly more complexity through the use of the transaction identifiers to track multiple changes to the same object, in addition to other protocol complexities such as the use of locks and acknowledgement messages to prevent conflicting changes to an object by multiple masters.

Based on the foregoing, there is a clear need for improved techniques for maintaining a unified state among a group of servers. In particular, there is a need for maintaining security associations among a group of servers that distributes group keys and policy to a group of clients serviced by the group of servers.

BRIEF DESCRIPTION OF THE DRAWINGS

The present invention is depicted by way of example, and not by way of limitation, in the figures of the accompanying drawings and in which like reference numerals refer to similar elements and in which.

DETAILED DESCRIPTION

Figure 1:
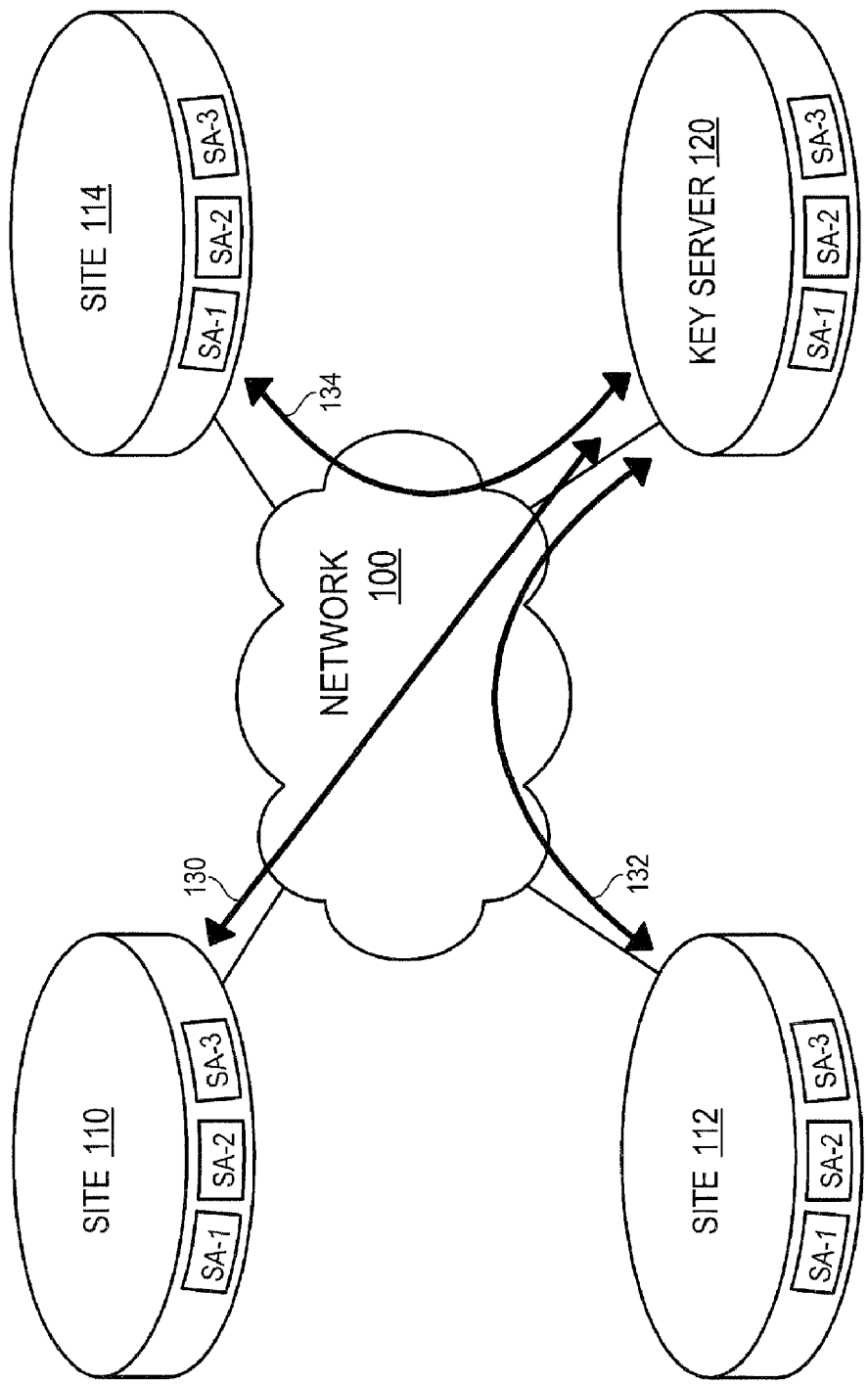
FIG. 1 is a block diagram that depicts a set of sites and a key server that are interconnected through a network and a group key management system.

A method and apparatus for managing state information by a group of servers that services a group of clients is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are depicted in block diagram form in order to avoid unnecessarily obscuring the present invention.

In the following description, the various functions shall be discussed under topic headings that appear in the following order:

1.0 General Overview
2.0 Structural and Functional Overview
   2.1 Introduction
   2.2 Structural Overview
   2.3 Functional Overview
      2.3.1 Initial Server Configuration
      2.3.2 Primary Server Fails
      2.3.3 Failed Server Returns
3.0 Primary Server and Secondary Servers
   3.1 Initializing a Server
   3.2 Changing Role from Secondary Server to Primary Server
   3.3 Changing Role from Primary Server to Secondary Server
   3.4 Functions of a Primary Server
   3.5 Functions of Secondary Servers
   3.6 Load Balancing Clients Among Servers
4.0 Failure Of A Primary Server
   4.1 Designating a New Primary Server
   4.2 Return of the Failed Primary Server
5.0. Handling Network Partitions 5.1 Designating a Primary Server When a Network Partition Occurs
5.2 Joining Network Partitions and Demoting a Primary Server
5.3 A Secondary Server as Intermediary Between Two Primary Servers
6.0 Using Timers to Detect an Unavailable Primary Server
6.1 Primary Periodic Timer
6.2 Dead Primary Timer
6.3 Re-Evaluation Role Timer
6.4 New Per-User Policy Timer
7.0 Protocol Messages
7.1 Announcement Messages
7.2 Message Format
8.0 States and State Machines
8.1 Local Stored State
8.2 High Level State Machine
8.3 Initialization State Machine
8.4 Secondary State Machine
8.5 Primary State Machine
9.0 Implementation Mechanisms and Hardware Overview
10.0 Extensions and Alternatives 1.0 General Overview Techniques are provided for managing state information by a group of servers that services a group of clients. In one embodiment, an approach for managing state information by a group of data processing servers that services a group of clients includes electronically causing one server of the group of data processing servers to be designated as a primary server. The primary server generates the state information to be used by both the group of data processing servers and the group of clients. The approach also includes electronically causing the remaining servers of the group of data processing servers to be designated as secondary servers. The secondary servers receive the state information from the primary server but do not generate the state information. In response to detecting that the primary server cannot communicate with at least one of the secondary servers, the approach further includes electronically causing one of the secondary servers to be designated as the primary server. The newly designated primary server generates additional state information to be used by both the group of data processing servers and the group of clients.

In other aspects, the primary server distributes the state information to the secondary servers. The primary server and the secondary servers are capable of adding or removing a client from the group of clients and distributing the state information to any client of the group of clients that contacts the primary server or one of the secondary servers. Electronically causing one of the secondary servers to be designated as the primary server includes electronically causing priority information to be compared between at least two secondary servers, and based on the comparison, causing the secondary server with the highest priority to be designated as the primary server.

In yet other aspects, the primary server that is not able to communicate with at least one secondary server includes the primary server not being able to communicate with a subgroup of secondary servers and a subgroup of clients. One secondary server in the subgroup of secondary servers is then designated as the primary server generates additional state information to be used by the subgroup of secondary servers and the subgroup of clients, while the original primary server that is not able to communicate with the subgroup of secondary servers and the subgroup of clients can still communicate with another subgroup of secondary servers and another subgroup of clients. When the original primary server is later able to communicate with both subgroups of secondary servers and both subgroups of clients, the state information from the two primary servers is synchronized, and one primary server is designated as a secondary server while the other primary server remains the primary server that generates additional state information for both the servers and the clients.

In still other aspects, each client includes an ordered listing of the data processing servers that each client uses to select a particular server from which to obtain state information. The ordered listings of clients can be arranged with a different ordering for different clients so that client requests are distributed among the data processing servers. The state information includes one or more objects, and the primary server can create and destroy existing objects but cannot modify the existing objects. The primary server and the secondary server are active servers, and each server is included in a different local area network (LAN). The state information includes one or more security associations based on Internet Protocol Security (IPsec) as defined in RFCs 2401, 2404, and 2406. The data processing servers use a group key management system based on Group Domain of Interpretation (GDOI) as defined in RFC 3547. The data processing servers provide IPsec keys to the clients based on GDOI as part of either a secure multicast feature or a group virtual private network (VPN) feature.

In another embodiment, an approach for managing state information to be used by data processing servers and clients includes electronically receiving the state information at one server from another server. Both servers are data processing servers, with one responsible for generating the state information while the other does not generate the state information to be used by the servers and clients. When the server not responsible for generating the state information detects that the other server is not able to communicate, then the server not responsible for generating the state information determines that that server should now be responsible for generating the state information, and then that server generates the state information.

In other aspects, the server that is now generating the state information detects that the other server is again able to communicate, and the server sends that other server state information. The server provides priority information to the other server and receives designation information from the other server that indicates that the other server is not responsible for generating the state information.

2.0 Structural and Functional Overview 2.1 Introduction

An approach for managing state information generally involves a group of servers that service a group of clients, such as key servers providing security associations to group members of a secure multicast. Among the group of servers, one server is designated as the primary server and is responsible for generating the state information, such as the security associations (SAs) based on the applicable security policy. The other servers in the group of servers are designated as secondary servers who receive the state information from the primary server, but who do not generate that state information on their own. Any of the clients can communicate with any of the servers to obtain the state information, such as the security association that includes the group keys for the group members to securely communicate among each other.

When the primary server fails or is otherwise not able to communicate with the secondary servers, one of the secondary servers changes role from a secondary server to the primary server, and thereafter generates the state information for use by the remaining secondary servers and the clients. The original primary server may fail on its own, or the original primary server may not be able to communicate with one or more of the secondary servers due to a network partition or other communications problem. In either case, from among the remaining secondary servers, a new primary server is designated.

If and when the server previously designated as the primary server comes back up, the server is initialized as a secondary server, and upon seeing that another of the servers is now the primary server, remains as a secondary server. If the server did not fail but was unable to communicate (e.g., as with a network partition event) is now able to again communicate after the communications problem is fixed (e.g., as with the healing of a network partition), then two primary servers would exist at the same time. In this situation, the two primary servers synchronize their state information and exchange priority information. Then the primary server with the highest priority remains in the role of the primary server while the other primary server changes role to become a secondary server.

By having multiple servers with one server in the role of the primary server and the rest of the servers in the role of secondary servers, the problem of having a single point of failure is addressed since any of the servers can change role and become the primary server. However, through the designation of only one server at a time as the primary server that is responsible for maintaining the state information for use by both the servers and the clients, all servers and clients use the same state information, and the problem of trying to track and coordinate changes by multiple creators of the state information is avoided. Also, because any secondary server can potentially become the primary server, at least one server is available to create state information for use by both the servers and the clients.

In the event of a network partition among geographically dispersed servers, the partition that does not include the original primary server can have a secondary server change role to become the primary server for that partition and thereafter generate the state information for that partition, while the other partition continues to operate with the original primary server. Because a primary server can change role to become a secondary server if more than one primary server is identified, such as when a network partition is healed, conflicts that might arise from having multiple primary servers are avoided.

The techniques described herein can be used to support multiple servers that are located on different local area networks (LANs), such as when the servers are geographically dispersed across a state, region, county, hemisphere, or the world. Geographically distributing the servers reduces the changes of one problem rendering multiple servers unable to service the clients. Also, while any client can generally interact with any of the servers, one or more load balancing approaches, such as those described herein, can be used to distribute the work load in servicing the clients among the servers based on the relative proximity of the clients to the servers (e.g., each server services those clients that are geographically closest to the server).

2.2 Structural Overview

Figure 2A:
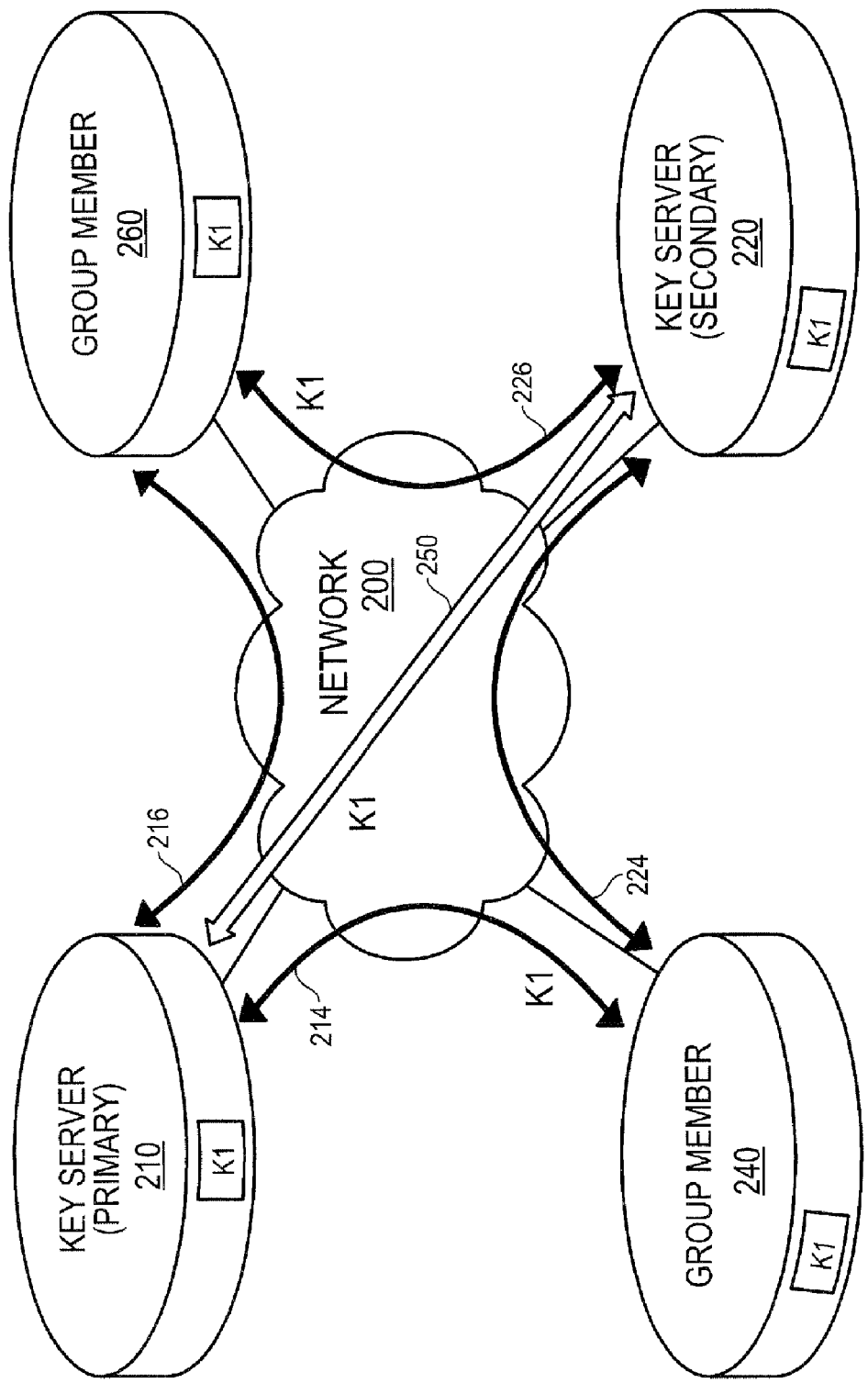
FIG. 2A, FIG. 2B, and FIG. 2C are block diagrams that depict an overview of an arrangement for managing state information by a group of servers that services a group of clients, according to an embodiment.
Figure 2B:
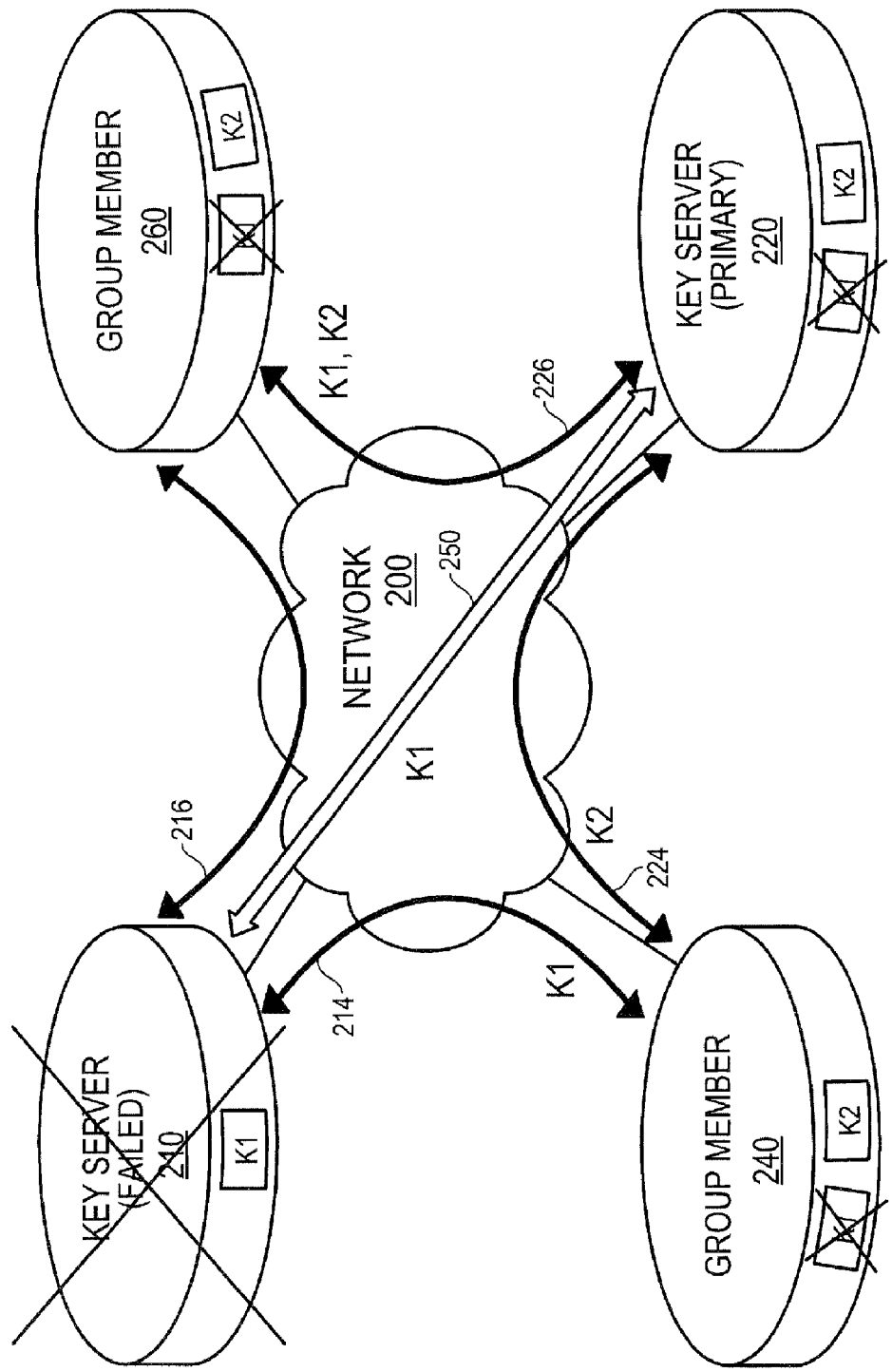
Figure 2C:
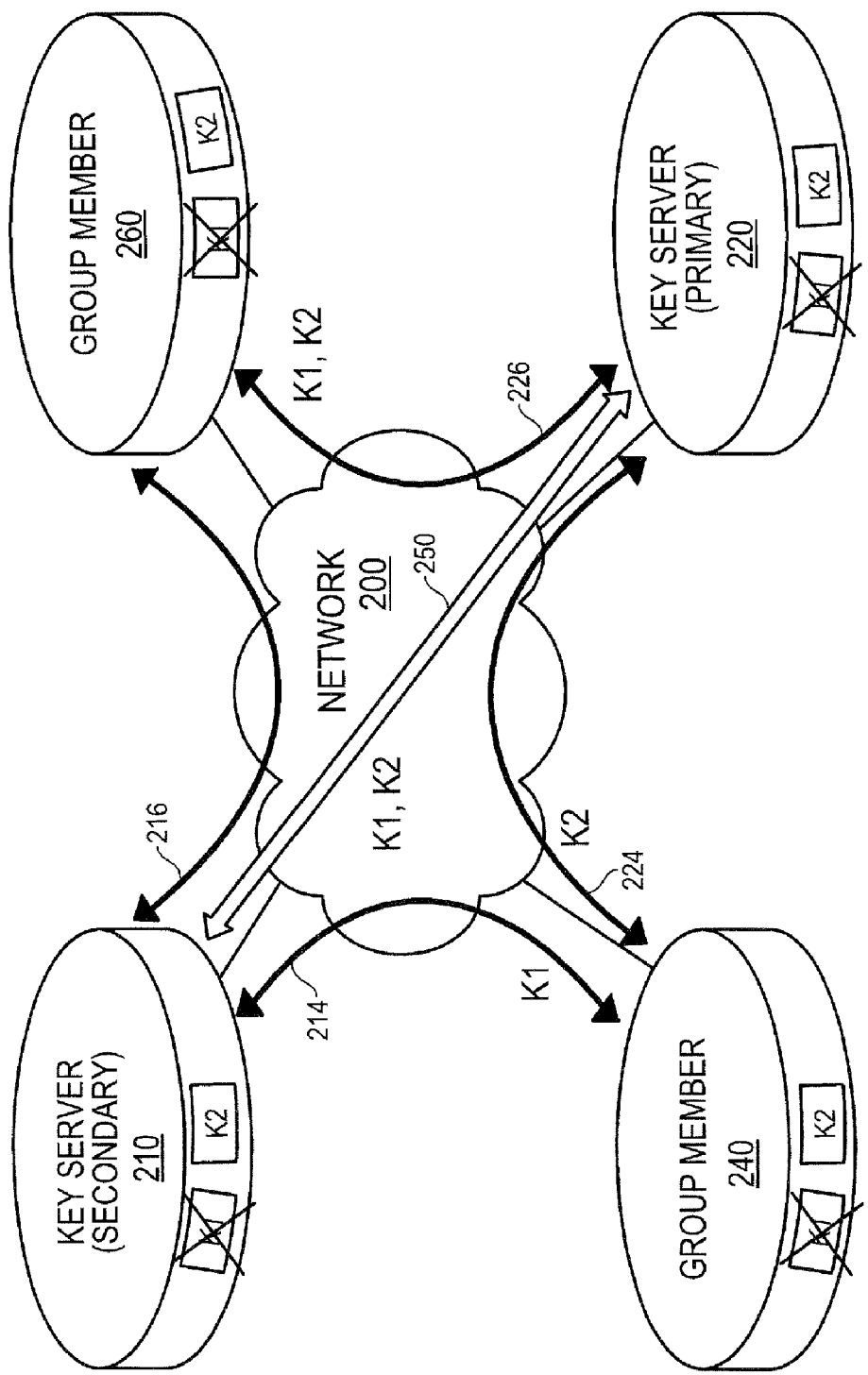

FIG. 2A, FIG. 2B, and FIG. 2C are block diagrams that depict an overview of an arrangement for managing state information by a group of servers that services a group of clients, according to an embodiment. FIG. 2A, FIG. 2B, and FIG. 2C are described in terms of key servers and group members of secure multicast, but any type of servers servicing any type of clients can be used. Also, FIG. 2A, FIG. 2B, and FIG. 2C are described with reference to keys and security associations for securing the multicast, although other types of objects within a set of state information can be used.

Finally, FIG. 2A, FIG. 2B, and FIG. 2C are depicted as including only two key servers and two group members for simplicity, but any number of key servers and group members can be used.

FIG. 2A depicts key servers 210, 220 and group members 240, 260 that are interconnected through a network 200 in which key servers 210, 220 service group members 240, 260 as part of a secure multicast group. Thus, key servers 210, 220 are examples of data processing servers and group members 240, 260 are examples of clients that operate according to the techniques described herein.

Network 200 can be a private network from an MPLS provider or any other type of network, such as a wide area network or the Internet. The elements of FIG. 2A identified as group members 240, 260 represent clients that are serviced by the group servers, such as the members of a secure multicast. In practice such elements are implemented using a "customer edge (CE) device," typically a router, that is located at the location of the customer of an MPLS provider, and the CE device connects to a "provider edge (PE) device," typically another router, that is part of the MPLS network. The CE device connects to the customer's network at the particular location, through which one or more end users interact, such as by using general-purpose computers that receive communications from other group members or the key servers through the CE device.

Typically, pair-wise connections are established between each pair of key servers in the group of key servers to facilitate communications between the key servers, such as for the exchange of state information such as the keys for the secure multicast. For example, connection 250 is a pair-wise connection between key server 210 and key server 220. Use of pair-wise connections between the key servers does not use a significant amount of network resources since the number of key servers is generally small compared to the number of group members (e.g., tens of servers versus hundreds or thousands of clients).

As depicted in FIG. 2A, key server 210 is the primary server and therefore is responsible for generating the state information, such as by generating a key K1 as part of a security association based on the selected IPsec policy. Key server 220 is a secondary server and therefore does not generate keys for use by the group but can distribute the keys for the group to the members of the secure multicast group.

For example, key server 210 is capable of distributing the key K1 to group members 240, 260 as depicted by arrows 214, 216, respectively. For the particular example depicted in FIG. 2A, key server 210 distributes the key K1 to group member 240, as depicted by arrow 214, but key server 210 does not distribute the key K1 to group member 260 because group member 260 obtains key K1 from key server 220 via arrow 226, as described below.

Key server 210 also distributes the key K1 to key server 220 over a connection 250. Although not depicted in FIG. 2A, if additional key servers were included, there would be additional pair-wise connections between each pair of key servers.

Key server 220 is capable of distributing the key K1 to group members 240, 260 as depicted by arrows 224, 226, respectively. For the particular example depicted in FIG. 2A, key server 220 distributes the key K1 to group member 260, as depicted by arrow 226, but does not distribute key K1 to group member 240 via arrow 224 since group member 240 obtains key K1 from key server 210, as described above with reference to arrow 214.

The situation depicted in FIG. 2A represents an early time in the secure multicast involving group members 240, 260 and key servers 210, 220, of which key server 210 is designated as the primary server and key server 220 is designated as the secondary server. Group members 240, 260 engage in the secure multicast based on using key K1 that group members 240, 260 received from key servers 210, 220, respectively.

FIG. 2B represents the situation in which key server 210 has failed at a later time than the time depicted in FIG. 2A, and therefore the elements of FIG. 2B are the same as in FIG. 2A, except for the differences discussed herein.

When key server 210 fails, there is no longer a server designated as the primary server within the group of data processing servers that servers group members 240, 260. Upon detecting that key server 210 has failed, key server 220 becomes the primary server with the responsibility for generating state information, such as additional keys for group members 240, 260, such as when the current policy and group key is about to expire, as specified by the IPsec protocol.

For example, as depicted in FIG. 2B, key server 220 generates a new key, K2, based on the upcoming expiration of key K1, and distributes K2 to members of the secure multicast group, such as by sending a rekey message to group members 240, 260, as depicted by arrows 224, 226. Following the expiration of key K1, group members 240, 260 continue communicating via the secure multicast based on key K2. Although key server 220 and group members 240, 260 may retain knowledge of key K1, because K1 has expired (as depicted by the "X"'s that cross out K1 within key server 220 and group members 240, 260), key K2 is now the current group key. Therefore, key K2 is subsequently used instead for secure communications among the members of the secure multicast group.

FIG. 2C represents the situation in which key server 210 has recovered from the prior failure and is now capable of servicing the group members of the secure multicast. Therefore, the elements of FIG. 2C are the same as in FIG. 2B, except for the differences discussed herein.

When key server 210 recovers from the prior failure, key server 210 returns to service as a secondary server. Because key server 220 is now the primary key server with the responsibility of generating new policy and keys for the secure multicast group, key server 210 is no longer responsible for key generation. Thus, when key K2 expires, key server 220 generates a new key K3 that is shared with key server 210 via connection 250 and then distributed to group members 240, 260 by key servers 210, 220, respectively. However, key server 210 is still capable of providing keys to group members when requested, and therefore, key server 210 obtains the current key, K2, from the primary server, key server 220, over pair-wise connection 250.

In the example of FIG. 2A, FIG. 2B, and FIG. 2C, after key server 210 recovers from the failure, key server 210 remains as a secondary server instead of being designated as the primary server, as in the initial situation of FIG. 2A. Key server 210 does not resume the role of the primary server because only one server of key servers 210, 220 is designated as the primary server. Generally, there is no need to switch the role of the primary server and the secondary server between key servers 210, 220 since either of key servers 210 and 220 is capable of fulfilling the responsibility of being the primary key server and generating new policy and group keys for use by the servers and clients.

However, in other implementations, upon the recovery of key server 210, key servers 210, 220 can determine if key server 210 should once again regain the responsibility of being the primary server, such as by comparing priority information and determining that key server 210 has a higher priority than key server 220. Such an implementation may be desirable depending on the specific details of the particular implementation, such as that key server 210 is a higher performance server and therefore the preferred choice to be designated as the primary server. In that situation, key server 220 can switch role from primary server to secondary server and key server 210 can switch role from secondary server to primary server.

2.3 Functional Overview

Figure 3A:
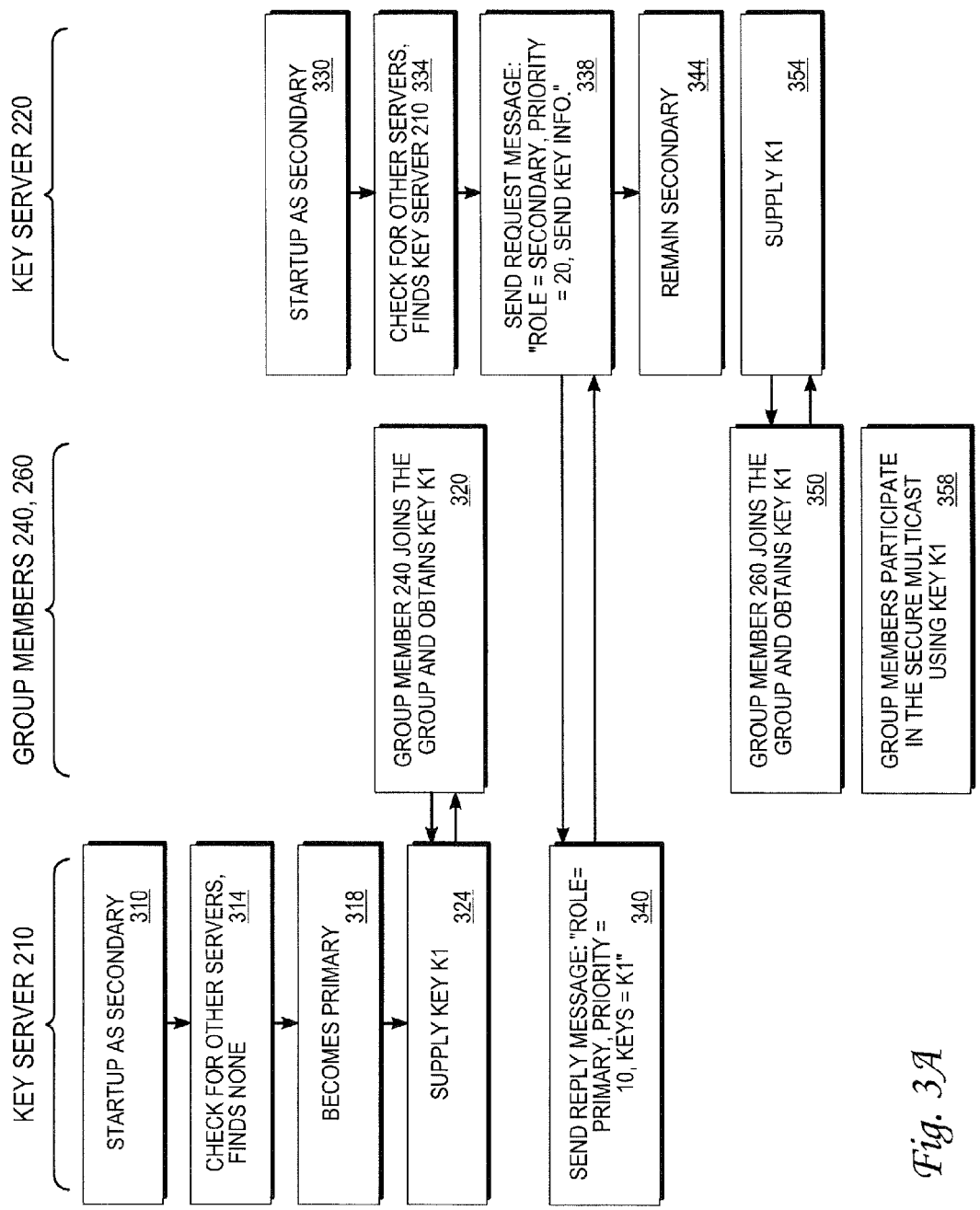
FIG. 3A and FIG. 3B are flow diagrams that depict an overview for an approach for managing state information by a group of servers that services a group of clients, according to an embodiment.
Figure 3B:
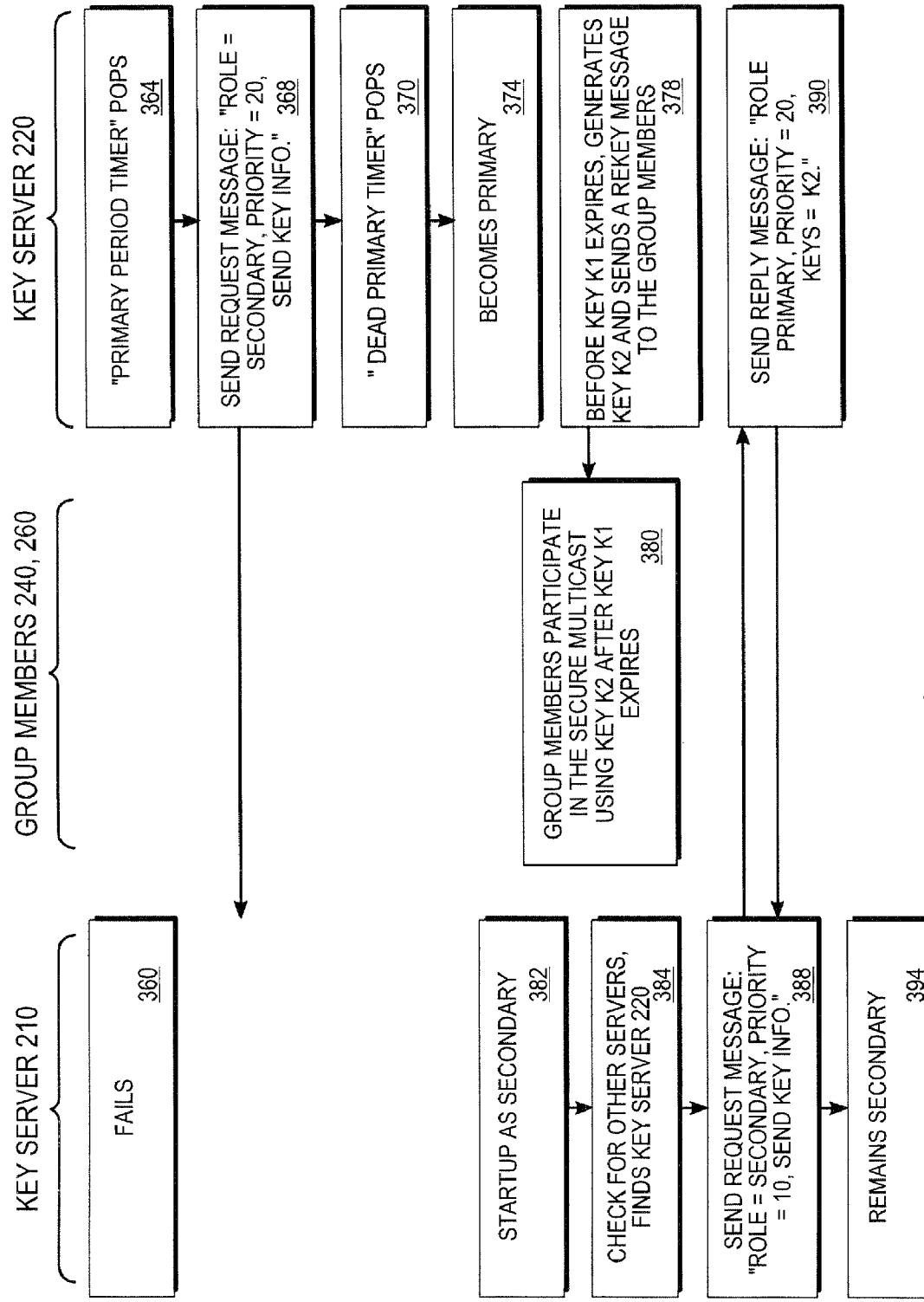

FIG. 3A and FIG. 3B are flow diagrams that depict an overview for an approach for managing state information by a group of servers that services a group of clients, according to an embodiment. FIG. 3A and FIG. 3B are described in terms of the key servers and the group members of secure multicast as depicted in FIG. 2A, FIG. 2B, and FIG. 2C, but any type of servers servicing any type of clients can be used besides those of FIG. 2A, FIG. 2B, and FIG. 2C. Also, FIG. 3A and FIG. 3B are described with reference to keys and security associations for securing the multicast, although other types of objects within a set of state information can be used. And FIG. 3A and FIG. 3B are depicted as including only two key servers and two group members for simplicity, but any number of key servers and group members can be used. Finally, in FIG. 3A and FIG. 3B, the different blocks are grouped under the headings key server 210, group members 240,260, and key server 220 to denote which entities in FIG. 2A, FIG. 2B, and FIG. 2C are performing the particular functions.

2.3.1 Initial Server Configuration

FIG. 3A begins with block 310 in which key server 210 starts up as a secondary server. For example, the data processing servers can be configured to initially be designated as a secondary server upon start-up, as opposed to initially being designated as a primary server since except for the first server to start-up, there will typically already be a server designated as the primary server.

In block 314, key server 210 checks for other servers and finds none. For example, following completion of start-up, key server 210 can check to see whether any other servers that are to cooperate together in servicing the clients are already up and running. Each key server can be configured to include a list of the servers in the group of data processing servers for a particular group of clients, and thus key server 210 can include a list of servers for this example implementation that identifies itself and key server 220. In this example, key server 210 finds no other servers because key server 220 has not yet started up.

In block 318, key server 210 becomes the primary server. For example, upon finding no other servers, and in particular no other server that is already designated as the primary server for the secure multicast group, key server 210 determines that key server 210's current role as a secondary server should be changed to designate key server 210 as the primary server. As a result, key server 210 updates a designation indicator to reflect that key server 210 is now the primary server instead of a secondary server. Following the change in role, key server 210 waits until one or more clients require state information, such as a group key for the secure multicast.

In block 320, group member 240 joins the group and requests key information from key server 210. For example, group member 240 includes an ordered list of key servers for the secure multicast group that identifies key server 210 and key server 220. Because key server 210 is listed first in the list, group member 240 contacts key server 210 to request to join the secure multicast group. Upon successful authentication, key server 210 adds group member 240 to the group and supplies group member 240 with the initial group key, K1, as depicted by block 324. Once group member 240 has the current group key, K1, group member 240 can participate in the multicast. However, since there are no other group members within the multicast yet, group member 240 waits for other members to join the group.

Although not depicted in FIG. 3A, if group member 240 were unable to successfully contact and interact with key server 210, group member 240 would move on to the next key server in the ordered list, key server 220, to attempt to join the group.

In block 330, key server 220 starts up as a secondary server. For example, as explained above with respect to block 310 and key server 210, key server 220 is configured to be designated as a secondary server upon start-up.

In block 334, key server 220 checks for other servers and finds key server 210. For example, following the completion of start-up, key server 220 can check the list of key servers for the group to determine that key server 210 should also be servicing the group members. In this example, key server 220 finds that key server 210 is present because key server 210 has already started up.

In block 338, key server 220 sends a request message to key server 210 with the following information: "role=secondary, priority=20, send key information." The first item in the message is key server 220's current role, with "secondary" indicating that key server 220 is designated to fulfill the role of a secondary server. The second item in the message is the priority of key server 220, which in this example is 20. The third item in the message is a request for the message recipient to send key information, such as the current and previous group keys for the secure multicast.

In block 340, key server 210 sends a reply message to key server 220 with the following information: "role=primary, priority=10, keys=K1." The first item in the message is key server 210's current role, with "primary" indicating the key server 210 is designated to fulfill the role of the primary server. The second item is key server 210's priority, which is 10 in this example. The third item is the list of current keys, which includes the current group key, K1, which is also the only key that has been generated for the group so far.

In block 344, key server 220 remains a secondary server. For example, when key server 220 receives the reply message from key server 210 that indicates that key server 210 is the primary server, key server 220 determines that there is no need for key server 220 to become the primary server, so key server 220 remains designated as a secondary server. However, in other implementations, the servers can be configured to have the server with the highest priority be the primary server, and in such an implementation, key server 220 would determine that key server 220 should become the primary server since key server 220's priority of 20 is greater than key server 210's priority of 10.

In block 350, group member 260 joins the group and requests key information from key server 220. For example, group member 260 includes an ordered list of key servers for the secure multicast group that identifies key server 220 and key server 210. Because key server 220 is listed first in the ordered list, group member 260 first contacts key server 220 to request to join the secure multicast group. Upon successful authentication, key server 220 adds group member 260 to the group and supplies group member 260 with the initial group key, K1, as depicted by block 354.

In this example, both group members 240 and 260 include an ordered list of key servers, but with different key servers identified in the first position in the list. Through the use of the ordered listings, the work required to serve the group members by the key servers can be shared, or load balanced. As in this example, key server 210 serviced group member 240 while key server 220 serviced group member 260. Although either of key servers 210 and 220 could have authenticated and supplied the current group key K1 to one or both of group members 240 and 260, the use of different ordered listings of key servers by the group members allows the workload in servicing the group members to be shared. Therefore the use of ordered lists by the group members represents a form of load balancing of the workload in the servers servicing the clients, although a separate load balancing device is not required.

While a key server can easily service two group members as in this example, in other implementations involving hundreds or even thousands of group members with a limited number of key servers, say just ten key servers, dividing up the responsibility for servicing the group members prevents a bottleneck situation that could occur if all of the hundreds or thousands of group members were serviced by just a single key server.

As with group member 240 and although not depicted in FIG. 3A, if group member 260 were unable to successfully contact and interact with key server 220, group member 260 would move on to the next key server in the list, key server 210, to attempt to join the group.

In block 358, group members 240 and 260 participate in the secure multicast using current group key K1. For example, now that both group member 240 and group member 260 have joined the group and know the current group key, K1, group members 240 and 260 can interact via network 200 by encrypting and decrypting multicast messages using group key K1.

At the end of FIG. 3A, key servers 210 and 220 and group members 240 and 260 are in the configuration depicted in FIG. 2A, namely that key server 210 is the primary group server, key server 220 is a secondary group server, group member 240 belongs to the group and has obtained key group K1 from key server 210, and group member 260 also belongs to the group and has obtained group key K1 from key server 220.

2.3.2 Primary Server Fails

The first portion of FIG. 3B depicts the functions and interactions that occur when a primary key server, such as key server 210 in FIG. 2A, fails and a secondary key server, such as key server 220 in FIG. 2A, changes designation to become the primary key server, resulting in the configuration depicted in FIG. 2B.

In block 360, key server 210 fails. For example, key server 210 can crash or lock up, thereby rendering key server 210 unable to service group members 240, 260. As another example, a problem can occur in the connection between key server 210 and network 200. As yet another example, a problem can arise within network 200 that isolates key server 210 from key server 220 and group members 240 and 260. These last two examples are more illustrative of network partitioning events, which are described more fully below, instead of being characterized as a "failure" of key server 210 since key server 210 has not itself failed, but rather the connections between key server 210 and one or more other key servers have failed or are otherwise not functioning correctly.

In block 364, a "primary period timer" pops on key server 220. For example, key server 220 can be configured to include a timer that tracks how much time has passed since the last communication from the primary server, key server 210. When the time since the last communication from the primary server exceeds a specified time, the time is said to have been exceeded, or the timer is said to have "popped." The popping of the primary period timer indicates that there is a potential problem that warrants further action by key server 220 to resolve.

In block 368, key server 220 sends a request message to key server 210 with the following information: "role=secondary, priority=20, send key information." For example, the same message that key server 220 sent in block 338 is used.

In block 370, a "dead primary timer" pops on key server 220. For example, key server 220 can be configured to include a timer that tracks how much time has passed since the last communication sent to the primary server, key server 210, that requested a reply but for which no reply has been received. When the time since the last communication sent to the primary server without a response exceeds a specified time, the timer pops, indicating that the primary server is "dead" or at least unable to respond.

In block 374, key server 220 becomes the primary server. For example, upon the expiration of the "dead primary timer," key server 220 determines that there is no other server currently performing the functions of the primary server, and so key server 220 determines that key server 220's current role as a secondary server should be changed to designate key server 220 as the primary server. As a result, key server 220 updates a designation indicator to reflect that key server 220 is now the primary server instead of a secondary server. Following the change in role, key server 220 waits until one or more clients require state information, such as a group key for the secure multicast when another group member joins the group, or when a current group key is about to expire and should be replaced with a new group key.

In block 378, before key K1 expires, key server 220 generates key K2 and sends a rekey message to the group members that transmits the new group key, K2. For example, key server 220 can track the expiration time of the current group key, K1, and when the current group key is going to expire within a certain amount of time, key server 220 generates a new security association based on the current IPsec policy, including a new group key, K2, and then key server 220 transmits the new group key to each of group members 240, 260 prior to the expiration of group key K1.

In block 380, group members 240 and 260 participate in the secure multicast, using key K2 after key K1 expires. For example, group member 240 and group member 260 both know the new group key, K2, and after the initial group key, K1, expires, group members 240 and 260 can interact via network 200 by encrypting and decrypting multicast messages using group key K2.

2.3.3 Failed Server Returns

The second portion of FIG. 3B depicts the functions and interactions that occur when the failed server, such as key server 210 in FIG. 2B, recovers from a failure and returns to service the group members of the secure multicast, resulting in the configuration depicted in FIG. 2C.

In block 382, key server 210 starts up as a secondary server. For example, if key server 210 had failed due to a crash or other problem that required key server 210 to reboot, key server 210 would start-up as a secondary server, just as in block 310.

In block 384, key server 210 checks for other servers and finds key server 220. For example, just as in block 314, key server 210 uses a list of key servers for the multicast group to check for the presence of any of the other key servers. However, unlike in block 314, here key server 210 finds that key server 220 is already up and running.

In block 388, key server 210 sends a request message to key server 220 with the following information: "role=secondary, priority=10, send key information." As in the request message sent by key server 220 in block 338, here key server 210 is announcing itself to key server 220 and providing some of key server 210's basic information plus requesting the current state information in the form of the group keys.

In block 390, key server 220 sends a reply message to key server 210 with the following information: "role=primary, priority=20, keys=K2." This is the same type of reply message as was sent by key server 210 in block 340, except here the key information includes the current group key, K2, but not the expired group key, K1.

In block 394, key server 210 remains a secondary server. For example, when key server 210 receives the reply message from key server 220 that indicates that key server 220 is the primary server, key server 210 determines that there is no need for key server 210 to become the primary server, so key server 220 remains designated as a secondary server. However, as noted above, other implementations can be used in which the key server with the highest priority is determined to be the primary server. Yet even in that situation, because key server 220's priority of 20 is greater than key server 210's priority of 10, key server 210 would still remain designated as a secondary server.

At the end of FIG. 3B, key servers 210 and 220 and group members 240 and 260 are in the configuration depicted in FIG. 2C, namely that key server 210 is a secondary server, key server 220 is the primary server, group members 240 and 260 both belong to the group and each has obtained key K2 from key server 220 via a rekey message.

Subsequently, if key server 220 fails, key server 210 can assume the responsibility as the primary server in the same manner as key server 220 did when key server 210 fails.

3.0. Primary Server and Secondary Servers 3.1 Initializing a Server

In one embodiment, a server is initialized as a secondary server. For example, when a server in a group of data processing servers is initialized to provide service to a group of clients, the server can be configured to have an initial role of a secondary server, instead of an initial role as a primary server. Each server in the group of data processing servers is initialized as a secondary server, which is the role that all the servers except for the primary server will have. By having each server begin as a secondary server, the number of designation changes that are required is minimized because only one server is designated as the primary server.

In another embodiment, a server is initialized as a primary server. For example, when a server in a group of data processing servers is initialized to provide service to a group of clients, the server can be configured to have an initial designation of a primary server, instead of an initial designation as a secondary server. Each server in the group of data processing servers is initialized as a primary server, although only one server will remain designated as the primary server. For example, as each server is initialized, a comparison of the newly initialized primary server's priority to that of the current primary server can be made, and the server with the highest priority is determined to be the primary server, with the other server changing role to that of a secondary server.

In yet another embodiment, one or more servers are initialized as a primary server, while the remaining servers are initialized as a secondary server. For example, if some of the servers are particularly suited to be the primary server, such as a result of having the best capability to generate state information or otherwise having little or no other processing responsibilities, can be initialized as a primary server, and then use priority information to determine which server should continue as the primary server. The remaining servers are configured to initialize as secondary servers, although if necessary, one or more of the secondary servers can change designation to primary server, if the previous primary server is no longer available.

3.2 Changing Role from Secondary Server to Primary Server

A server can change role from being a secondary server to the primary server. For example, the first key server to initialize for a secure multicast group will find no other key servers, and therefore the first key server to initialize determines that the current designation as a secondary server should be change to indicate that the server is the primary server. As another example, if the primary server fails or is otherwise unavailable, a secondary server can determine that the current designation as a secondary server should be change to indicate that the server is the primary server.

In general, any server can change role from being a secondary server to being the primary server, although there is typically just one primary server at any given time among the group of data processing servers that are servicing the clients.

The determination to change role is generally made by a secondary server itself, although in other implementations, another server, device, mechanism, user, or administrator can instruct a secondary server to change designation to become the primary server.

3.3 Changing Role from Primary Server to Secondary Server

A server can change role from being the primary server to a secondary server to the primary server. For example, if the primary server is no longer able to communicate with one or more secondary servers, yet the primary server has not itself suffered a failure, a network partitioning event has likely occurred in which communications from and to the primary server are disrupted, resulting in two partitions, one of which includes the primary server and the other of which includes one or more secondary servers.

After the network partitioning problem is resolved and the primary server can again communicate with the other servers and clients, the primary server will typically find that another server is designated as the primary server for those servers and clients that were in the other partition. When the two partitions are joined, there will be two primary servers among the group of data processing servers servicing the clients. As a result, one of the primary servers changes role to become a secondary server.

When there are two primary servers for a limited time, as in the case of a network partitioned being fixed and the joining of the two partitions, the two primary servers can synchronize each primary server's state information to determine a consistent set of state information for both primary servers, and then the primary servers can compare priority information to determine which primary server should remain as the primary server (e.g., the server with the highest priority) and which primary server should change role to become a secondary server.

For example, if a network partition has existed for some time, each partition will have a primary server that is responsible for generating state information for the clients and secondary servers within the given partition. Over time, additional state information is generated and distributed among the secondary servers and clients. In the context of a secure multicast, each partition will operate as a separate secure multicast using keys generated by the partition's primary server.

When the network partitions are later joined together, clients are initially unable to communicate because the state information for the two partitions will typically be different. In the context of a secure multicast, this means that each partition has a different current group key, and therefore the group members in one partition are unable to communicate with the group members of the other partition following the joining of the partitions. Following the join, the two primary key servers synchronize their different key sets, so that each has full knowledge of any keys that were generated by the other partition when the partition existed. The synchronized group keys can then be distributed to the clients by one or more of the key servers.

After the state information is synchronized following the joining of the partitions, the two primary servers determine which server should remain as primary. For example, the primary server with the highest priority will remain as primary while the other primary server will change designation to secondary. Thereafter, the primary server is responsible for generating new state information, such as new keys, and distributing the new keys to the secondary servers, from which the clients obtain the new keys either by request or by rekey messages.

3.4 Functions of a Primary Server

One function of a primary server that is different than that of a secondary server is the generation of state information by creating one or more objects. For example, in a secure multicast, only the primary key server generates new security associations based on IPsec, which means that only the primary key server generates new group keys for the secure multicast group. Once the primary server has generated the state information, the primary server communicates the state information to the secondary servers. Thereafter, the clients receive state information from either the primary server or the secondary servers.

In some implementations, the primary server is also the only server responsible for deleting or destroying state information. For example, if a group member leaves a secure multicast, the group key typically needs to be changed to prevent the leaving group member from later being able to decrypt the multicast communications. In this situation, the primary server is responsible for not only generating the new group key, but also for specifying that the old group key is no longer valid and should be removed from the current keys for the group. Note that destroying the old group key by specifying that the old group key is no longer valid is different than a group key that expires, following which the expired group key is removed from the state information for the group by the primary and secondary servers.

In one embodiment, the primary server is capable of creating new objects to include within the state information or destroying existing objects within the state information, but the primary server is not capable of modifying existing objects within the state information. For example, in the multicast context, the primary server can create or delete SAs and group keys, but the primary server does not modify an existing SA or an existing group key.

The primary server can be characterized as an "active" server because the primary server is able to respond to requests from clients and other servers and can send messages to clients and servers, in contrast to a server that is "not active" or in "standby" that only acts if the active server is unable to act.

The primary server can be characterized as a "master" server because the primary server is the only server able to create or destroy state information, whereas the secondary servers can be characterized as "slave" servers that can only read the state information but cannot create or destroy state information.

In general, the remaining functions of the primary server are the same as those for the secondary servers, as described below. However, in some implementations, the primary server can be responsible for only generating the state information and communicating the state information to the secondary servers, and as a result, the primary server does not perform the other functions of the secondary servers, as described below.

3.5 Functions of Secondary Servers

The secondary servers can share state information with the primary server, with the other secondary servers, and with the clients serviced by the servers. For example, in a secure multicast, the secondary key servers can obtain security associations and group keys from the primary server or other secondary servers, and then the secondary key servers can provide the security associations and group keys to clients, either in response to clients joining the group or proactively as part of rekey messages prior to a current security association expiring.

Secondary servers also manage the membership of the group of clients. For example, in a secure multicast, the secondary key servers can handle members joining a secure multicast group and members leaving the secure multicast group.

In general, the secondary servers can provide any type of service to the clients and can interact in any manner with the other servers except that the secondary servers cannot create or destroy the state information to be used by both the servers and the clients. For example, in a secure multicast, if a secondary server is handling the departure of a group member, the secondary server can inform the primary server, the other secondary servers, and the remaining group members of the departure, but only the primary server can generate a new group key to be used after the departing member has left the group.

3.6 Load Balancing Clients Among Servers

In one embodiment, clients can be load balanced among a group of data processing servers. For example, a client can include an ordered listing of the servers that are available to service the client, and the client makes requests of the servers based on the ordered listing, working through the list until the client finds a server with which the client can communicate to obtain the desired response.

As a specific example, if the client has a request to make of a server, the client sends the request to the server that is listed first in the ordered listing. If that server fails to provide a suitable response, the client sends the request to the next server on the list, and so on, until the client's request receives a suitable response. When making a subsequent request, the client can either start at the top of the ordered listing, or begin with the last server from whom the client received a suitable response.

Different clients can have different ordered listings. For example, some clients can have a list such as KS1, KS2, and KS3 to denote key servers 1, 2, and 3. Other clients can have a list such as KS2, KS3, and KS1. Yet other clients can have a list such as KS3, KS2, and KS1. Clients using the first list contact KS1 first, whereas clients using the second list contact KS2 first, and client with the third list contact KS3 first. As a result, over time client requests can be distributed among the three key servers, instead of most going to KS1, as would be the case if each client had the first list, thereby providing for a basic form of load balancing of client request among the group of servers without the use of a traditional load-balancing device.

The ordering of the servers on the client ordered lists can be developed based on the particular factors of a given implementation. For example, for a geographically dispersed group of clients in a secure multicast that includes clients in numerous countries and in which there are a limited number of national or regional key servers, the client lists can be ordered to specify the servers based on proximity to the client. As a specific example, each client's list of the servers has the closest server listed first, then the next closest server, and so on.

In another embodiment, an anycast address, such as in Internet Protocol version 6 (IPv6) Anycast Address, is used in place of a server address. Routing considerations would determine which server in the group of servers would receive the request, typically based on which server is closest to the client. The degree of load balancing that results would be similar to the geographical distribution of the clients that are making the requests.

In yet another embodiment, a round-robin domain name server (DNS) is used to distribute requests. A request would specify a server by hostname instead of an IP address, and the DNS translates the name to a specific IP address. The DNS server can include the addresses of the group of servers so that individual requests are mapped to the server addresses in a round-robin manner, thereby distributing the client requests among the servers.

4.0 Failure of a Primary Server

4.1 Designating a New Primary Server

Following the failure of a primary server, one of the secondary servers can be designated as the new primary server using any of a number of approaches. For example, as discussed above with respect to FIG. 2B and FIG. 3B, key server 220 determines that because key server 210 has failed, key server 220 should change role from being a secondary server to the primary server.

As another example, if there are multiple secondary servers, the secondary servers determine which secondary server should become the primary server. For example, the secondary servers can compare priority information to determine which secondary server has the highest priority and therefore determine that the secondary server with the highest priority should become the primary server. As yet another example, the first secondary server to detect that the primary server has failed is determined to be the secondary server that should become the primary server. Also, the secondary server that is the least busy can be selected as the secondary server that should become the primary server. Yet another example is that a secondary server can be randomly selected from among the secondary servers to become the primary server. Another example is that the secondary server with the first IP address is determined to be the secondary server that should assume the role of the primary server. In general, any election approach can be used to determine which secondary server should become the primary server when the need for a secondary server to assume the role of the primary server is identified.

In general the determination of which secondary server is to become the new primary server following the failure of the current primary server is made by one or more of the secondary servers themselves. However, in other implementations, another device besides the secondary servers themselves can aid in all or part of the election process to determine which secondary server should become the primary server, based on an appropriate set of criteria, such as the priority information or the secondary server workloads. Regardless of how a secondary server is selected, when the need to designate a primary server arises, one secondary server changes role to become the new primary server when the current primary server is no longer able to serve as the primary server.

4.2 Return of the Failed Primary Server

If and when a failed primary server recovers from the failure, the server returns to servicing the clients. As discussed above with respect to FIG. 2C and FIG. 3B, the server returns as a secondary server and checks to see if there is a primary server, and if so, the server remains designated as a secondary server.

However, if the server is not able to identify another server as the primary server, the returning server determines that the returning server should change designation from secondary server to the primary server, and then does so. This may occur if there are no other secondary servers that are available to service the clients or when the failed server returns so quickly following the failure that the failure went undetected by any of the secondary servers.

In some implementations, upon recovery of the failed primary server, the failed server assumes the responsibility of being the primary server, and if a secondary server has become the new primary server in the absence of the failed server, the new primary server changes designation back to being one of the secondary servers. Such an approach may be appropriate when there is a desire to have one particular server always be the primary server, if possible. Also, if the system is configured such that the server with the highest priority is to be the primary server, then when that highest priority server recovers from a failure, that highest priority server will resume being the primary server.

When the failed primary server returns, whether or not the failed primary server remains as one of the secondary servers or resumes responsibility as the primary server, the returning server exchanges state information with either the current primary server or one of the secondary servers. As a result, the recovered server has the most current state information, which can be used to respond to requests from any of the clients.

5.0. Handling Network Partitions
5.1 Designating a Primary Server When a Network Partition Occurs When a network partition occurs, the network is effectively divided in two smaller networks or partitions for the purposes of the data processing servers providing service to the clients. In the example of FIG. 2, assume that a network partition occurs such that key server 210 and group member 240 are in one partition, while key server 220 and group member 260 are in the other partition. While key server 210 is designated as the primary server and can generate and distribute state information to the group members in the corresponding partition (e.g., group member 240), key server 220 is designated as a secondary server and there is no other server in the other partition designated as the primary server. As a result, key server 220 becomes the primary server for the other partition, and thereafter can generate state information for the group members belonging to the corresponding partition (e.g., group member 260).

Figure 4A:
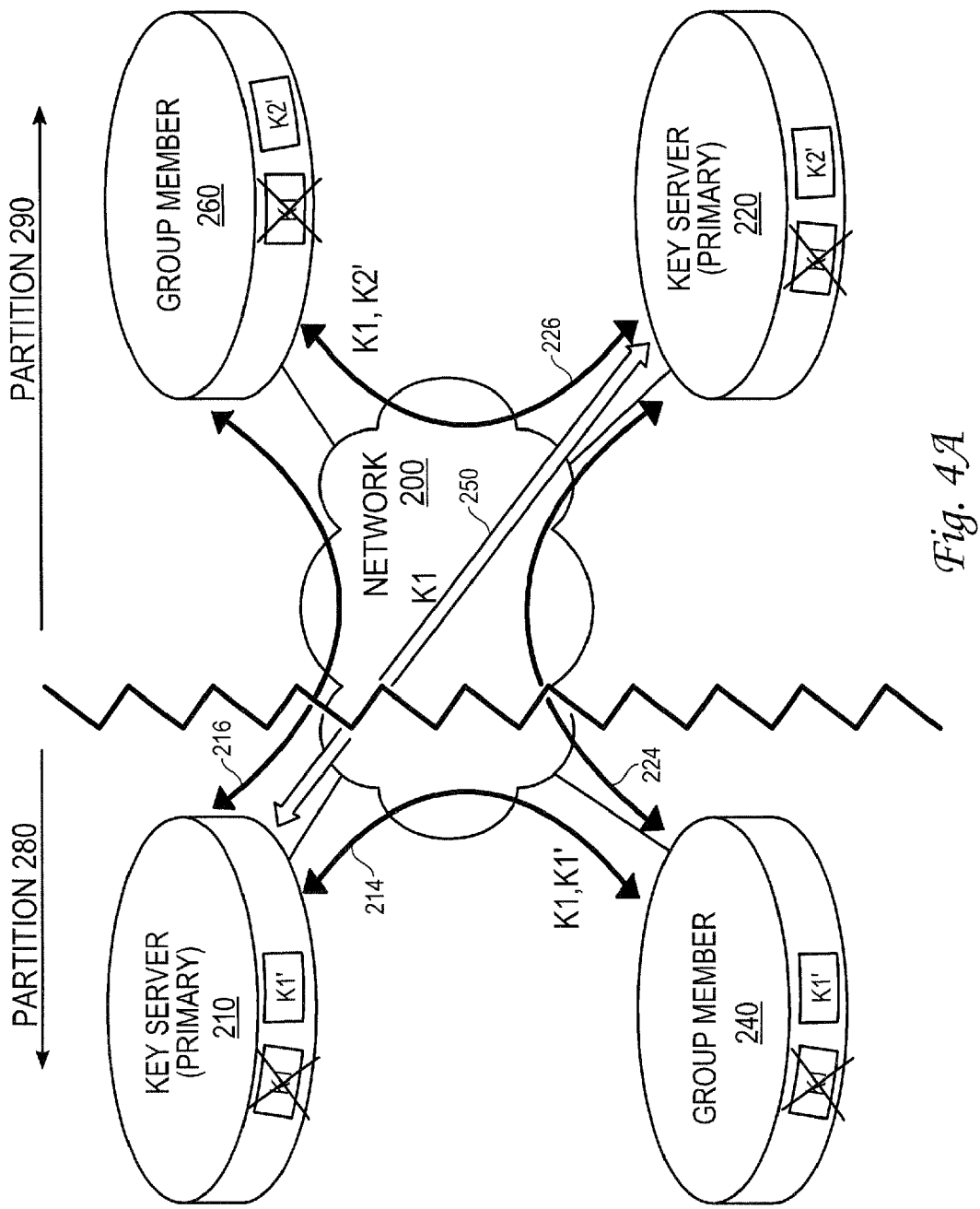
FIG. 4A and FIG. 4B are block diagrams that depict an overview of an arrangement for managing state information when a network partition occurs and heals, respectively, according to an embodiment.
Figure 4B:
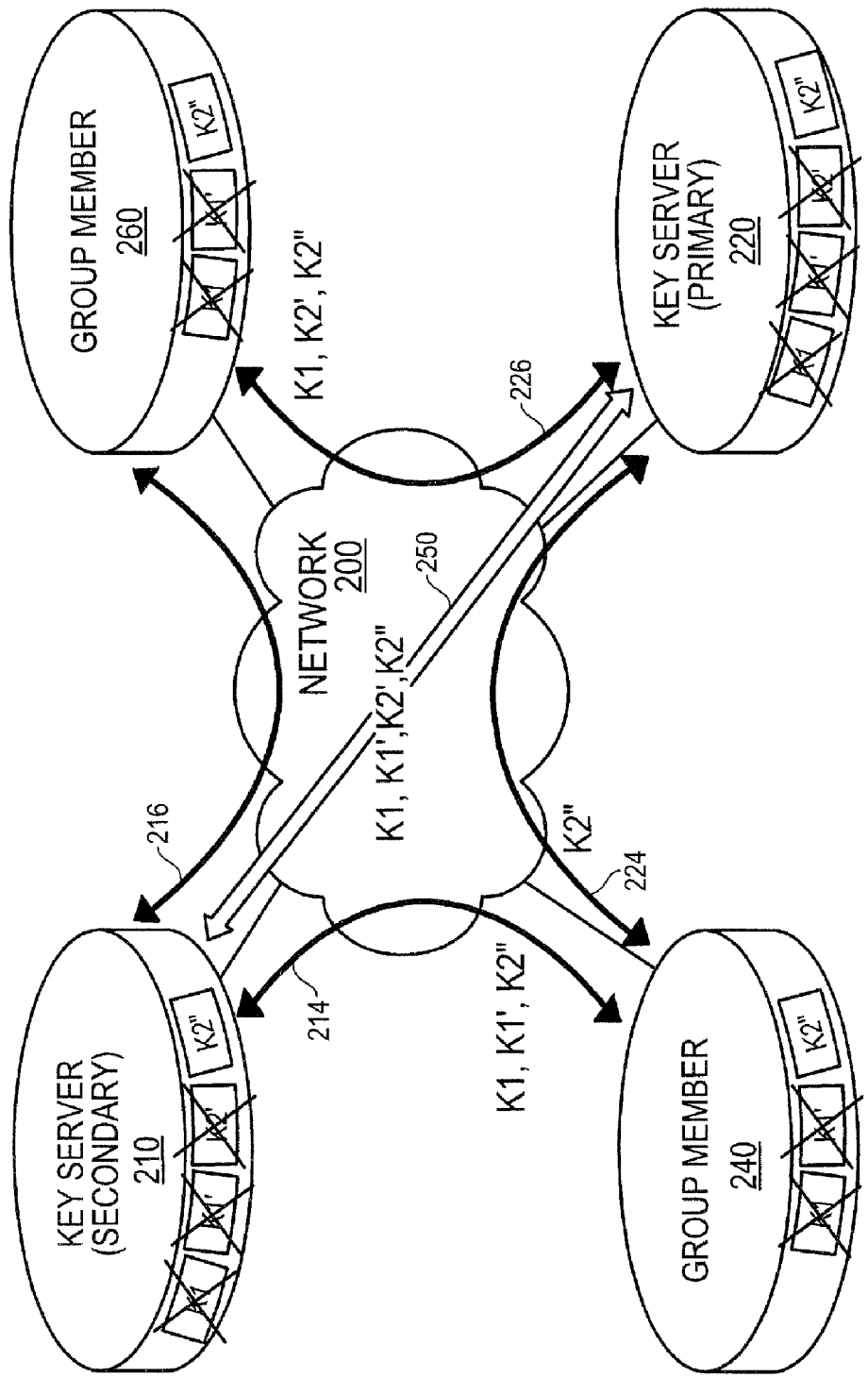

FIG. 4A and FIG. 4B are block diagrams that depict an overview of an arrangement for managing state information when a network partition occurs and heals, respectively, according to an embodiment. FIG. 4A and FIG. 4B are described in terms of key servers and group members of secure multicast, but any type of servers servicing any type of clients can be used. Also, FIG. 4A and FIG. 4B are described with reference to keys and security associations for securing the multicast, although other types of objects within a set of state information can be used. Finally, FIG. 4A and FIG. 4B are depicted as including only two key servers and two group members for simplicity, but any number of key servers and group members can be used.

FIG. 4A depicts the example of FIG. 2A after a network partition occurs, resulting in partition 280 that includes key server 210 and group member 240 and in partition 290 that includes key server 220 and group member 240. Partition 280 can function with key server 210 acting as the primary server, with key server 210 having the responsibility for generating new keys for use by group member 240 and any other group members within partition 280 (although for clarity, no other group members within partition 280 are depicted in FIG. 4A). For example, FIG. 4A depicts key server 210 generating a new key K1' and transmitting key K1' to group member 240, as depicted by arrow 214.

However, partition 290 has no primary server as a result of the network partition, and therefore key server 220 eventually detects that key server 210 has "failed" (although the apparent failure is not the result of key server 210 failing but rather from the inability of key server 220 to communicate with key server 210 due to the partition through network 200). Key server 220 determines that key server 220 should become the primary server, and thereafter key server 220 generates new keys for use by group member 260 and any other group members within partition 290 (although for clarity, no other group members within partition 290 are depicted in FIG. 4A). For example, FIG. 4A depicts key server 220 generating a new key K2' and transmitting key K2' to group member 240, as depicted by arrow 226.

Figures 5A, 5B:
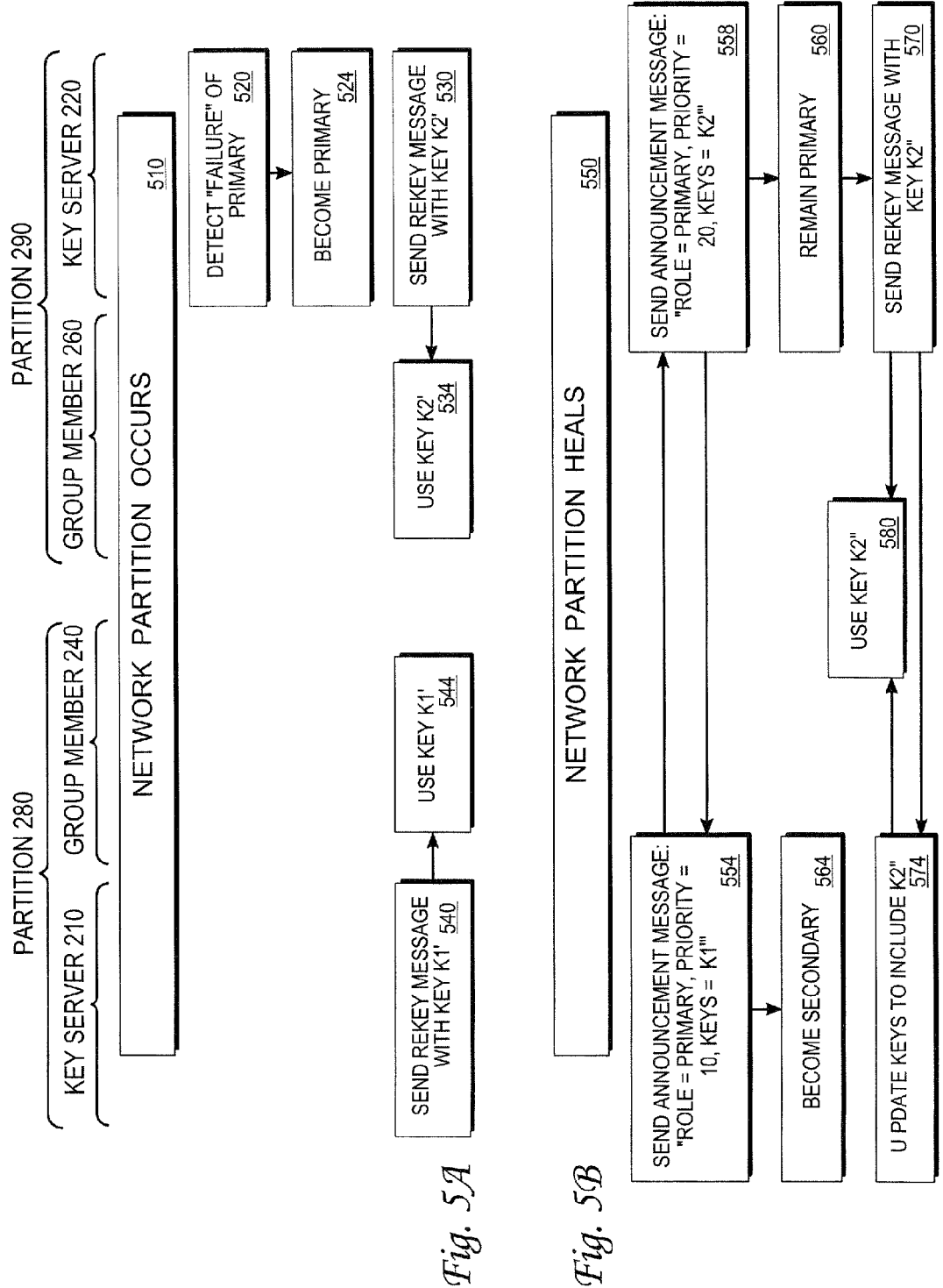
FIG. 5A and FIG. 5B are flow diagrams that depict an overview for an approach for managing state information when a network partition occurs and is healed, respectively, according to an embodiment.

FIG. 5A is a flow diagram that depicts an overview for an approach for managing state information when a network partition occurs, according to an embodiment. FIG. 5A is described in terms of the key servers and the group members of secure multicast as depicted in FIG. 4A, but any type of servers servicing any type of clients can be used besides those of FIG. 4A. Also, FIG. 5A is described with reference to keys and security associations for securing the multicast, although other types of objects within a set of state information can be used. And FIG. 5A is depicted as including only two key servers and two group members for simplicity, but any number of key servers and group members can be used. Finally, in FIG. 5A, the different blocks are grouped under the headings partition 280 and partition 290, under which additional headings for key server 210 and group member 240 plus key server 220 and group member 260 are provided, to denote which entities in FIG. 4A are performing the stated functions and in which partition each entity is located.

In block 510, a network partition occurs. For example, if the arrangement depicted in FIG. 2A undergoes a network partition, the result is the arrangement depicted in FIG. 4A.

In block 520, key server 220 detects the "failure" of the primary server. For example, key server 220 has a "primary period timer" pop due to not receiving any messages from key server 210 in a specified time, as described above with respect to block 364. Also, key server 220 attempts to contact key server 210, as in block 368 above, but is not successful based on a dead primary timer popping, as in block 370 above. Observe that while key server 220 believes that key server 210 has failed, key server 210 has not failed but is only unable to communicate with key server 220 due to the network partition. Thus, the network partition results in key server 210 appearing to have failed from the viewpoint of key server 220.

In block 524, key server 220 becomes the primary server for partition 290. For example, upon detecting that key server 210 has "failed," key server 220 determines that there is no other server currently performing the functions of the primary server, and so key server 220 determines that key server 220's current role as a secondary server should be changed to designate key server 220 as the primary server. As a result, key server 220 updates a designation indicator to reflect that key server 220 is now the primary server instead of a secondary server.

In block 530, key server 220 sends a rekey message with key K2'. For example, prior to the expiration of key K1, key server 220 generates a new group key K2' and sends a rekey message to the group members of partition 290, such as group member 260.

In block 534, group member 260 and any other group member within partition 290 uses the new key K2'. For example, group member 260 can interact with other group members within partition 290 (although no other group members are depicted in partition 290 in FIG. 4A) via the portion of network 200 that is within partition 290 by encrypting and decrypting multicast messages using key K2'. However, group member 260 cannot communicate with group member 240 or any other group members within partition 280 due to the network partition.

In partition 280, which includes key server 210 and group member 240, key server 210, which was designated as the primary server prior to the partition, continues serving as the primary server for partition 280.

In block 540, key server 210 sends a rekey message with key K1'. For example, prior to the expiration of key K1, key server 210 generates a new key K1' and sends a rekey message to the group members of partition 280, such as group member 240.

In block 544, group member 240 and any other group member within partition 280 uses the new key K1'. For example, group member 240 can interact with other group members within partition 280 (although no other group members are depicted within partition 280 in FIG. 4A) via the portion of network 200 that is within partition 280 by encrypting and decrypting multicast messages using key K1'. However, group member 240 cannot communicate with group member 260 or any other group members within partition 290 due to the network partition.

As long as the network partition exists, key server 210 continues to serve as the primary server for partition 280 while key server 220 continues to serve as the primary server for partition 290. Although not depicted in FIG. 4A and FIG. 5A, if each partition included additional key servers, the responsibility for acting as the primary server within each partition can change among the servers, such as when a primary server fails, as described above in Section 4.0. However, within each partition, there is generally one server at any given time that acts as the primary server. Also, each of partitions 280 and 290 could experience additional network partitioning events, resulting in more than three or more network partitions, any of which can be healed and joined as described herein.

5.2 Joining Network Partitions and Demoting a Primary Server

After a network partition occurs, in most case the problem that causes the network partition is eventually fixed, resulting in the healing of the network partition and subsequent joining back together of the previously separate network partitions. In this situation, because each separate network partition includes a primary server, there are two primary servers immediately following the network join. For example, in the example of FIG. 4A, both key servers 210 and 220 are designated as primary servers for partitions 280 and 290, so that when the network partition is removed, there are two primary servers.

Because both primary servers could create new state information, yet only one is needed and only one is desired to avoid having to coordinate the two different servers creating state information, one primary server is demoted back to being a secondary server. For example, one of key servers 210 and 220 changes role back to that of a secondary server, leaving the other primary server as the only primary server among the group of data processing servers that services the clients for the group. Therefore, only one primary server is designated and has responsibility for generating state information for use by the other secondary servers and the clients.

FIG. 4B depicts the example of FIG. 4A after the network partition is healed, resulting in key servers 210 and 220 and group member 240 and 260 being able to communicate among each other, as in FIG. 2A. However, immediately after the network partition heals, there are two primary servers, key server 210 that was the primary server for partition 280 and key server 220 that was the primary server for partition 290, yet the arrangement only needs and should only have one primary server.

Also, because the current group key being used by group member 240 and the other group members that were in partition 280 is K1', and because the current group key being sued by group member 260 and the other group members that were in partition 290 is K2' (recalling that the old group key K1 has expired), group members 240 and 260 cannot communicate due to the use of different group keys. Thus, a new group key is needed that can be distributed to all group members so that all group members can communicate securely as part of the multicast group.

Upon being able to communicate, key servers 210 and 220 synchronize the state information that each has by exchanging each server's list of keys. For example, key server 210 communicates key K1' over connection 250 to key server 220, and likewise key server 220 communicates key K2' over connection to key server 210. In addition to synchronizing the keys, each key server transmits the server's current role and priority information. In this example, both of key servers 210 and 220 are designated as primary servers, but key server 210's priority is 10 while key server 220's priority is 20.

Based upon the priority information, key server 220 determines that no change is role is necessary because key server 220's priority is greater than key server 210's priority. However, key server 210 determines that because key server 220 has a higher priority, key server 210 should change role to become a secondary server. Thus, as depicted in FIG. 4B, key server 210 is a secondary server while key server 220 is the primary server.

Comparing FIG. 4B, which depicts the arrangement after the joining of network partitions 280 and 290, to FIG. 2A, which depicts the arrangement prior to the network partition occurring, shows that the designation of primary server has moved from key server 210 to key server 220. Yet in both cases, both key server 210 and 220 have the same keys based on synchronizing the key information following the joining of the network partitions.

FIG. 5B is a flow diagram that depicts an overview for an approach for managing state information when a network partition is healed, according to an embodiment. FIG. 5B is described in terms of the key servers and the group members of secure multicast as depicted in FIG. 4B, but any type of servers servicing any type of clients can be used besides those of FIG. 4B. Also, FIG. 5B is described with reference to keys and security associations for securing the multicast, although other types of objects within a set of state information can be used. And FIG. 5B is depicted as including only two key servers and two group members for simplicity, but any number of key servers and group members can be used. Finally, in FIG. 5B, the different blocks are grouped under the headings key server 210, group members 240, 260, and key server 220 to denote which entities in FIG. 4B are performing the stated functions.

In block 550, the network partition heals. For example, the underlying network outage or other problem that resulted in partitions 280 and 290 is fixed, thereby allowing key servers 210 and 220 and group members 240 and 260 to again be able to communicate with each other.

In block 554, key server 210 sends an announcement message to key server 220 with the following information: "role=primary, priority=10, keys=K1'." For example, upon detecting that key server 220 is available via connection 250, key server 210 sends a message similar to the reply messages of blocks 340 and 390 to key server 220.

Similarly, in block 558, key server 220 sends an announcement message to key server 210 with the following information: "role=primary, priority=20, keys=K2'." For example, upon detecting that key server 210 is available via connection 250, key server 220 sends a message similar to the reply messages of blocks 340 and 390 to key server 210.

As part of blocks 554 and 558, upon receipt of the announcement messages, key servers 210 and 220 synchronize the keys each server originally had plus the keys received from the other server. For example, key server 210 that receives keys K1 and K2' from key server 220 determines that while key server 210 already knew about key K1, key server 210 did not know about key K2', and therefore, key server 210 adds key K2' to the list of keys maintained by key server 210. Similarly, key server 220 determines that while K1 is an old key, key K1' is new and therefore is added to the list of keys maintained by key server 220.

In block 560, key server 220 remains the primary server. For example, key server 220 compares the priority information from key server 210 (e.g., "priority=10") to key server 220's own priority information (e.g., "priority=20"), and because key server 210's priority is less, key server 220 remains as the primary server. As a result, key server 220 remains responsible for generating key information for the group.

However, in block 564, key server 210 becomes secondary. For example, key server 210 compares the priority information from key server 220 (e.g., "priority=20") to key server 210's own priority information (e.g., "priority=10"), and because key server 220's priority is greater, key server 210 changes role from primary server to secondary server. As a result, key server 210 no longer generates new keys for the group members, and instead key server 210 distributes the key information generated by key server 220 to the group members, as required.

In block 570, key server 220 sends a rekey message with key K2". For example, after synchronizing keys with key server 210, key server 220 determines that some group members do not know about key K2', and therefore key server 220 determines that a new key should be generated, even if the current keys being used, keys K1' and K2', have not yet expired.

As a result, key server 220 generates a new key K2", and distributes new key K2" to key server 210 via connection 250. In addition, key server 220 distributes the new key K2" to group member 260, such as is depicted in FIG. 4B by arrow 226.

In block 574, key server 210 updates the keys to include new key K2". For example, key server 210 adds key K2" to the list of keys maintained by key server 210, and thereafter, key server 210 can distribute new key K2" to group member 240, such as is depicted in FIG. 4B by arrow 214.

In block 580, group members 240 and 260 participate in the secure multicast using new key K2". For example, group member 240 and group member 260 both know the new group key, K2", and thereafter can interact via network 200 by encrypting and decrypting multicast messages using key K2".

5.3 A Secondary Server as Intermediary Between Two Primary Servers

While some network partitions effectively split a network into two separate partitions, such as partitions 280 and 290 depicted in FIG. 4A, other network partitions are not necessarily so widespread that there are two completely separate partitions. For example, network 200 in FIG. 4A could undergo network failures that cripple connection 250 and some other connections within network 200, leaving key server 210 and key server 220 unable to communicate, but there are sufficient remaining connections that group members 240 and 260 and possibly other servers can communicate.

For example, assume that there is a third key server in an arrangement, such as that in FIG. 4A, and that the network partition prevents key server 210 and 220 from communicating due to the failure of connection 250, but that a third key server remains able to communicate with both key server 210 and 220. If the third key server is the primary server, there is no problem, as the third key server remains able to distribute the state information generated to both secondary servers.

However, if the third key server is a secondary server, then the primary server, say key server 210, cannot communicate directly with the key server 220 that is designated as a secondary server, along with the third key server. In this situation, the third key server can exchange state information with both key servers 210 and 220, thereby effectively acting as an intermediary between key servers 210 and 220. As a result, any new state information that is created by key server 210 can be communicated to both the third key server directly and to key server 220 indirectly via the third key server.

6.0 Using Timers to Detect an Unavailable Primary Server

An unavailable primary server can be detected by one or more secondary servers using any suitable mechanism, such as a primary periodic timer and/or a dead primary timer. In addition, a re-evaluation role timer can be used to delay changing role from being a secondary server to the primary server, so as to allow time to receive announcements from any other secondary servers that are also about to change designation to the primary server.

6.1 Primary Periodic Timer

In some implementations, a primary periodic timer is used to determine whether or not a primary server is functioning normally or has either failed or is otherwise unreachable, such as the result of a failure of the primary server itself, a network partitioning event, or some other cause. For example, each time a secondary server receives a message from the primary server, the primary periodic timer is reset.

If the primary periodic timer satisfies a specified relationship with a specified value (e.g., the timer pops when the time is equal to greater than the specified time or when the time exceeds the specified time), then the secondary server is alerted to take one or more actions. For example, the secondary server can immediately assume the role of the primary server. As another example, the secondary server can contact one or more other secondary servers to determine whether any of the other secondary servers have received a message from the primary server within the specified time. As yet another example, the secondary server can attempt to verify the failure of the primary server, such as by sending a message to the primary server and waiting for a response.

6.2 Dead Primary Timer

In some implementations, a dead primary timer is used to determine whether or not a primary server is functioning normally or is unable to perform the functions of the primary server, such as the result of a failure of the primary server itself, a network partitioning event, or some other cause. For example, secondary servers can periodically send announcement or request messages to the primary server, or a secondary server can use a dead primary timer in response to the pop of a primary periodic timer, in order to see if the primary server responds to a message sent from the secondary server.

If the dead primary timer satisfies a specified relationship with a specified value (e.g., the time pops when the time is equal to greater than the specified time or when the time exceeds the specified time), then the secondary server can determine that based on the lack of a timely response from the primary server, that the primary server is dead or at least unavailable to fulfill the responsibilities of being the primary server by being unable to create new state information.

6.3 Re-Evaluation Role Timer

In some implementations, a re-evaluation role timer is used to delay the change in role for a server from being a secondary server to the primary server. The delay allows time for the secondary server to receive any announcements form other secondary servers that are about to assume the role of the primary server. If such announcements are received, the secondary server can re-evaluate whether to assume the role of the primary server, such as by comparing priority information. As a result, repeated changes by the secondary servers to and from the role of primary server, and the resulting changes in and distribution of state information, can be minimized or avoided.

6.4 New Per-User Policy Timer

In some implementations, a new per-user policy timer is used, such as when the logical key hierarchy (LKH) approach as defined in RFC 2627 is in effect for the group. LKH is an approach for efficiently re-keying a large group of clients for the purpose of excluding one or more group members, who have left the group, been compromise, or for some other reason should no longer be able to securely interact with the group. LKH typically employs a logical key tree in which each group member has a unique key, plus the logical keys above the group member in the logical key tree.

Per-user keys are the unique user specific keys that are used to effectively eject group members from the group. The new per-user policy timer will periodically pop so that the server will send any new per-user LKH keys that have been recently generated, so that the other servers know those recently generated LKH keys. Thus, such per-user keys become part of the group policy and are therefore examples of the types of objects that can be created by secondary servers and included in the state information for the group. However, such objects are only for use by a limited number of servers and group members, based on the LKH logical key tree, and therefore are not the type of objects within a set of state information that is only generated by the primary server for use by all the other servers and the clients for the group. Thus, in those implementations, the generation and distribution of such new per-user keys is the only data flow (e.g., state information) that does not originate at a primary server.

7.0 Protocol Messages
7.1 Announcement Messages

In one embodiment, interactions among the data processing servers, whether designated as the primary server or as one of the secondary servers, is accomplished using one type of message. For example, an announcement message is used that specifies the priority information for the sender (e.g., the server that sends the message), the sender's role (e.g., whether primary or secondary), a flag for a return message from the recipient, and the state information for the group.

Priority information can be specified by the system administrator as part of the configuration of each server. The priority information can be changed after initial configuration, such as by the system administrator making adjustments based on past performance of the group.

Priority information can be used for any suitable purpose, such as for deciding which secondary server among two or more secondary servers should assume the role of the primary server when there is no other server designated as the primary server or when a previously designated primary server is no longer available, such as due to the primary server failing or as a result of a network partition. For example, in choosing which secondary server should become the primary server, the secondary server with the largest priority is determined to be the proper choice. If the priority of two secondary servers is the same and no other secondary server has a larger priority, then another criteria can be used to decide among the secondary servers with the highest priority, such as based on the servers respective IP addresses or some other suitable criteria.

The role of the sender is used to determine which server is responsible for generating state information (e.g., which server is designated as the primary server) and which servers help to manage the group, such as by distributing state information to the clients and managing group membership, but which do not generate state information (e.g., the servers designated as the secondary servers). By sharing role information, the servers can determine whether a primary server is currently available for the group, so as to allow for one secondary server to assume the role of the primary server when necessary. Also, following a network partition that is later healed, there could be two primary servers initially, and by sharing role information, the two primary servers can recognize such a situation so that one primary server can change role back to being a secondary server (e.g., by comparing priority information).

The flag for indicating that the sender desires a return packet for the recipient allows for the sender to request and receive state information from the recipient, which the sender can use to update the locally stored state information by the sender. By using a flag to request a return message, all message can be implemented as one-way messages, thereby simplifying the interactions among the servers. Yet by requesting and receiving a response from the recipient, the servers can more quickly determine together whether a secondary server should assume the role of the primary server, or whether which server of two primary servers should revert back to the secondary server role, such that there remains only one primary server. The request flag can be set so that the sender can obtain the recipient's role, priority, and state information, regardless of whether or not the sender already has any of that information since any of the different pieces of information can potentially change over time, such as when a system administrator makes changes based on current or past performance.

The state information allows the sender to specify the state information for the group that is known by the sender. For example, the sender can specify the current IPsec security association and keys that are known by the sender. Upon receipt of the state information from another server, a server can compare and update the server's own state information, thereby ensuring consistency of the state information between the servers.

In another embodiment, two or more message types are used instead of one type of message. For example, a request message is used that includes the sender's priority, role, and that asks for the recipient's state information, but does not include the sender's state information. A reply message is then send in response to the request message, and the reply message includes that sender's priority, role, and state information, but does not ask for the recipient's state information.

In other implementations, more or less information can be included in a particular type of message. For example, instead of providing priority information to each other in the messages, each data processing server can already include a list of servers for the group that identifies the priority of each server.

Some implementations can include one or more security features for use with protocol messages that are sent among the data processing servers. For example, authentication can be used to verify that messages are sent from a legitimate peer server. As a specific example, when using IPsec, keys that fit into the Internet Security Association and Key Management Protocol (ISAKMP) authentication framework can be used, such as pre-shared secret keys, pre-shared Rivest-Shamir-Adleman (RSA) public keys, or Public Key Infrastructure (PKI) certificates containing RSA public keys. The use of public keys is beneficial for providing true source origin authentication.

As another example, each server can be pre-configured, and therefore is authorized to potentially be a server for the group. Also, announcements can employ encryption, such as the level of encryption employed during GDOI registration or with the sending of rekey messages. As yet another example, messages can include a monotonically increasing sequence number to provide replay protection, with the sequence number in the message itself or as part of an encapsulation protocol, such as IPsec.

Lastly, prior to sending state information to another server, the sender can require the recipient server to prove that the recipient is alive and functioning properly (e.g., "liveliness proof"), such as by employing a periodic liveliness check between the servers.

7.2 Message Format

Figure 6:
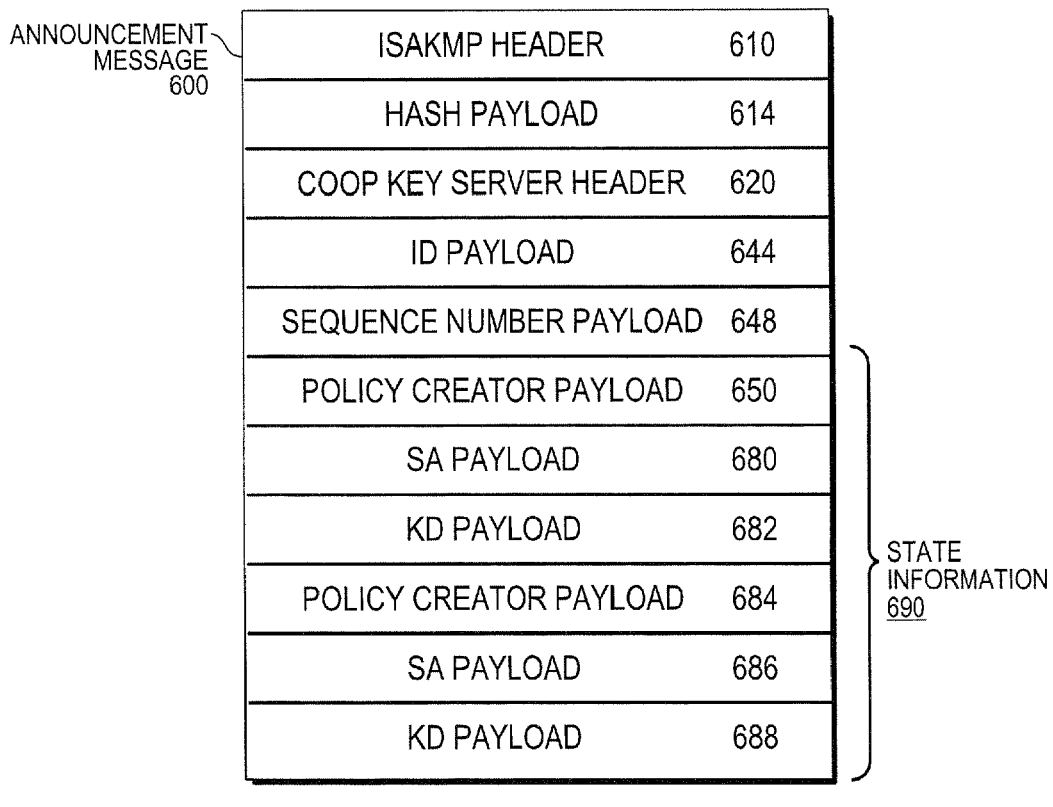
FIG. 6 is a block diagram depicting the format of a message, according to an embodiment.

FIG. 6 is a block diagram depicting the format for a message, according to an embodiment of the invention. FIG. 6 is described with respect to a system employing GDOI and IPsec, although other types of state information can be used. Although FIG. 6 depicts certain items within the message format, other messages can be used with fewer or more items than those of FIG. 6 or with a different arrangement or organization of the items than that depicted in FIG. 6.

FIG. 6 depicts an announcement message 600 that includes the following: a ISAKMP header 610; a hash payload 614; a coop key server header 620; an ID payload 644; a sequence number payload 648; a policy creator payload 650; an SA payload 680; a KD payload 682 a policy creator payload 684; an SA payload 686; and a KD payload 688. As depicted in FIG. 6, state information 690 includes policy creator payload 650, SA payload 680, KD payload 682, policy creator payload 684, SA payload 686, and KD payload 688, which can include the current SA and keys for the group, such as an SA that is about to expire, and the next SA and keys for the group, to be used when the current SA expires.

ISAKMP header 610 is the ISAKMP header as defined in RFC 2409. Hash payload 614 is the result of applying a hash function to the payload of announcement message 600.

Coop key server header 620 is depicted in FIG. 6 as including the following: a next payload 622 (to identify the payload type of the next payload in the message), reserved 624 (reserved for later use); a payload length 626 (the length of the current payload); an MJVER 628 and an MNVER 630 (for specify the major and minor version of the cooperative server implementation, respectively); a message type 632 (to specify the type of message, such as 0 for an announcement message in some implementations, or 0 for a request message and 1 for a reply message in other implementations); one or more flags 634 (such as to specify whether or not a reply message is desired); a role 638 (whether the sender is primary—"1"—or secondary—"2"); and a priority 640 (the priority value for the sender).

ID payload 644 identifies the group identifier for which the message is sent. Sequence number payload 648 provides the monotonically increasing sequence number for anti-replay protection.

Policy creator payload 650 is depicted in FIG. 6 as including the following: a next payload 652 (to identify the payload type of the next payload in the message); a reserved 654 (reserved for later use); a payload length 656 (the length of the current payload); an IP type 658 (the identification type of the policy creator, such as "1" for Internet Protocol version 4 (IPv4) and "2" for IPv6); and an ID payload 660 (the ID payload length, such as "4" for IPv4 and "16" for IPv6, and an identification value such as an IPv4 or IPv6 address corresponding to the identification type).

SA payload 680 includes the security association information, while KD payload 682 includes the key distribution information.

Policy creator payload 684, SA payload 686, and KD payload 688 are analogous to policy creator payload 650, SA payload 680, and KD payload 682. Each set of policy creator payload, SA payload, and KD payload represents policy from the key server identified in the ID payload of the Policy Creator Payload.

8.0 States and State Machines 8.1 Local Stored State

The servers, whether the primary server or one of the secondary servers, maintain a small amount of state information locally as part of the server. In one embodiment, the locally stored state information for a server includes the pre-configured priority value for the server and a data structure for each known peer server (e.g., each of the other known data processing servers for the group).

The data structure for each peer server includes the following: the identity of the server (e.g., the server's IP address), the role of the server in the most recent message (e.g., primary or secondary), and the priority of the server in the most recent message.

The set of data structures for the known peer servers can be referred to as the peer key server database, which summarizes the known state of all other servers and can be used for a particular server to decide whether the serve should change designation (e.g., from secondary to primary if there is no known primary server or from primary to secondary if there is more than one primary server).

8.2 High Level State Machine

Figure 7:
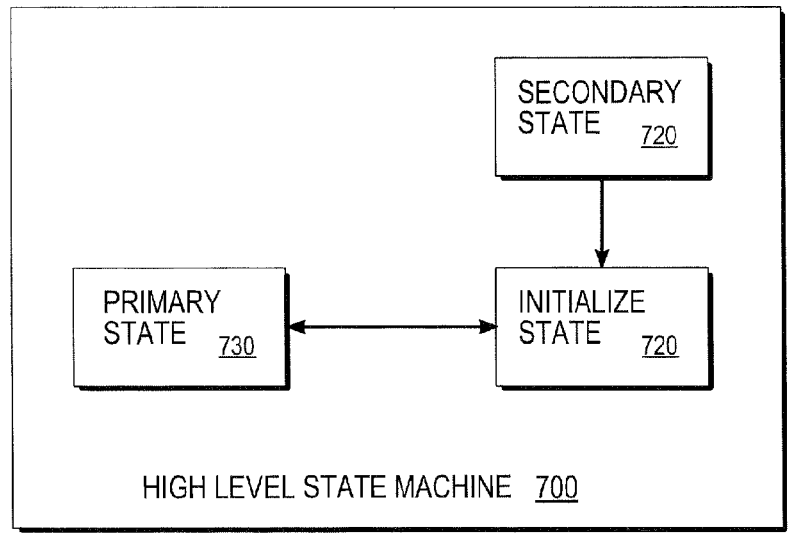
FIG. 7 is a block diagram depicting a high level state machine, according to an embodiment.

FIG. 7 is a block diagram depicting a high level state machine 700, according to an embodiment. High-level state machine 700 includes an initialize state 710, a secondary state 720, and a primary state 730. Example implementations of initialize state 710, secondary state 720, and primary state 730 are described in more detail below with respect to FIG. 8, FIG. 9 and FIG. 10, respectively.

In the example of FIG. 7, each server begins in initialize state 710 at the startup of the system or when the system is configured. After transitioning from initialize state 710 to secondary state 720, the server determines whether or not a primary server is already available. If there is no other primary server available, the server transitions from secondary state 720 to primary state 730. Later the server can transition from primary state 730 to secondary state 720, such as following a network partition event that is later healed, resulting in two primary servers for the group for which one primary server is demoted to being a secondary server.

8.3 Initialization State Machine

Figure 8:
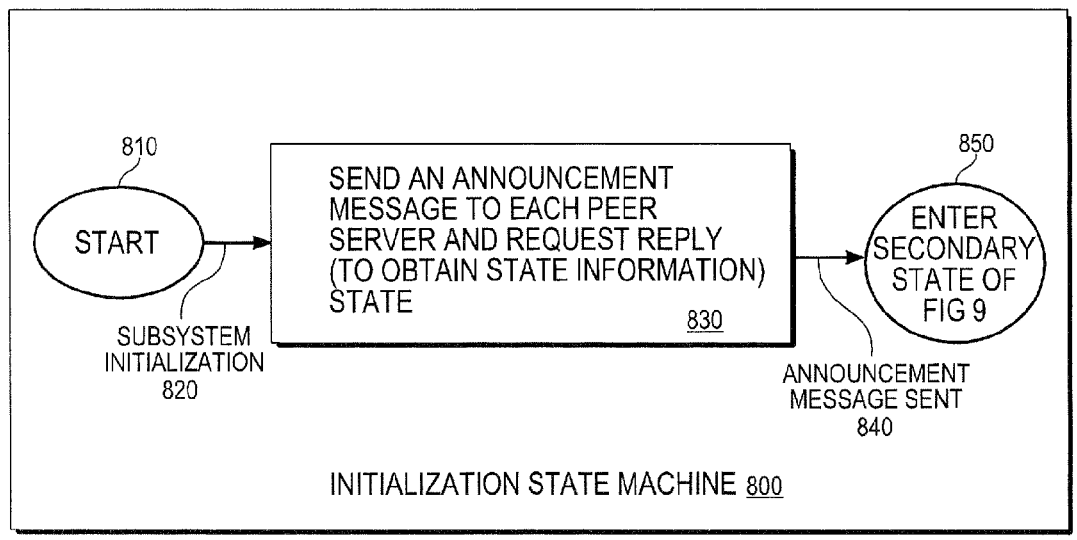
FIG. 8 is a block diagram depicting an example of a initialization state machine, according to an embodiment.

FIG. 8 is a block diagram depicting an example of an initialization state machine 800, according to an embodiment. Initialization state machine 800 begins with the start-up of the server, as represented by oval 810. The server then undergoes subsystem initialization 820 so that the server is able to send an announcement message to each peer server and request a reply (to obtain the state information known to each peer server) state 830.

Figure 9:
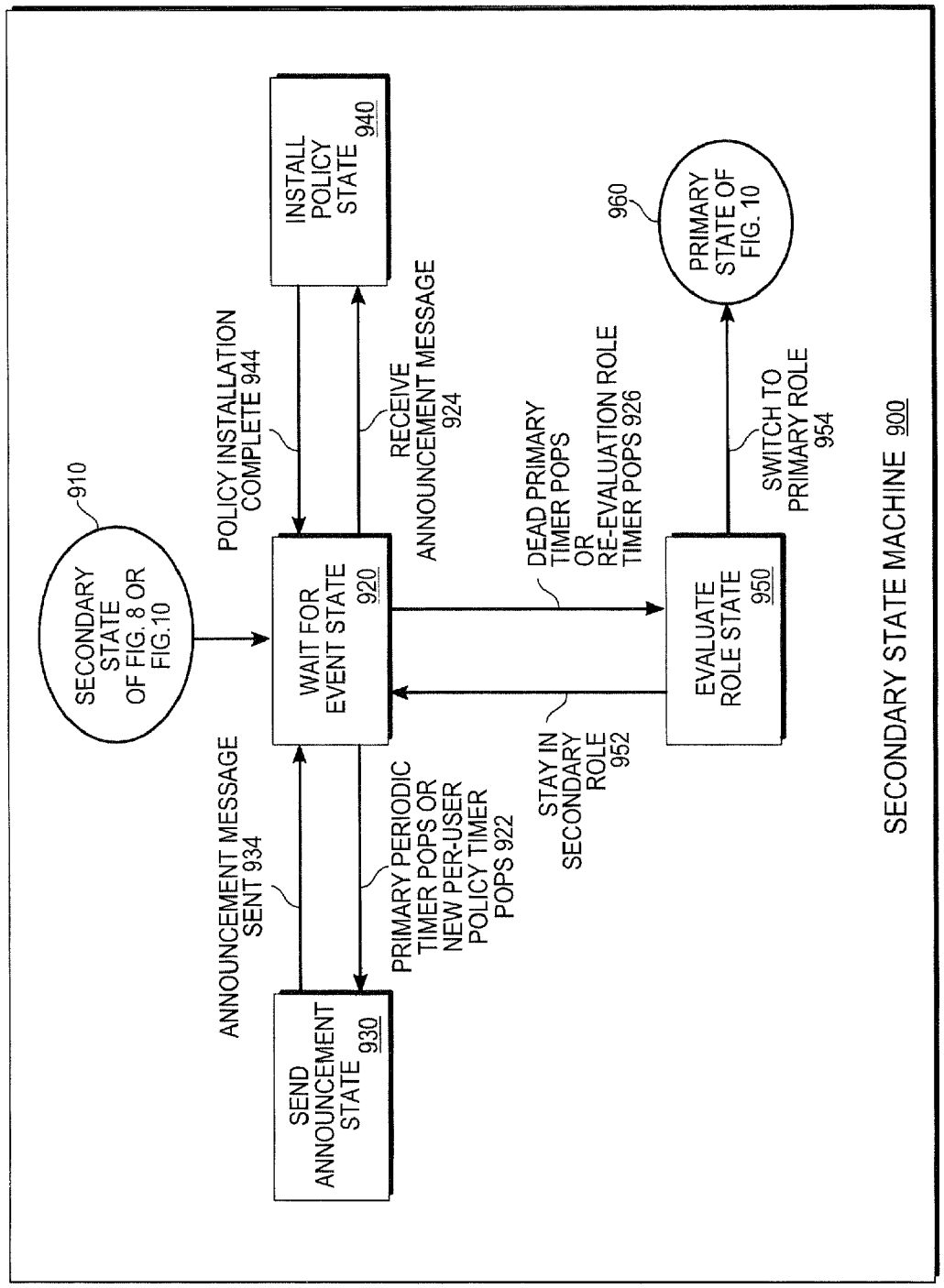
FIG. 9 is a block diagram depicting an example of a secondary state machine, according to an embodiment.

Finally, as a result of the announcement message being sent 840, the server enters the secondary state machine 900 of FIG. 9, as represented by oval 850.

8.4 Secondary State Machine

FIG. 9 is a block diagram depicting an example of a secondary state machine 900, according to an embodiment. Secondary state machine 900 begins with entry into the secondary state as indicated by oval 910, which can be reached from oval 850 of the initialization state machine 800 of FIG. 8 or from oval 1060 of the primary state machine 1000 of FIG. 10.

Secondary state machine 900 then enters the wait for event state 920. Any of several events can cause the secondary server to leave wait for event state 920, following which the secondary server will re-enter wait for event state 920, except when the secondary server determines that the secondary server's role should change to become the primary server.

The secondary server leaves wait for event state 920 if the primary periodic timer pops or the new per-user policy timer pops, as depicted by arrow 922. The primary periodic timer pops when messages have not been received from the primary server in a specified amount of time, and the new per-user policy timer pops periodically to facilitate the distribution of any recently generated per-user keys to the other servers for the group.

Arrow 922 leads to the send announcement state 930, in which the secondary server sends an announcement message to the other servers for the group. When the announcement message is sent, as depicted by arrow 934, the secondary server transitions back to wait for event state 920. When the announcement is sent, the primary periodic timer or new per-user policy timer is reset, depending on which timer popped that lead to send announcement state 930.

The secondary server leaves wait for event state 920 if an announcement message is received, as depicted by arrow 924, following which the secondary server enters install policy state 940. For example, upon receipt of an announcement message, the secondary server compares the received state information to the locally stored state information, and updates the latter based on the former, as appropriate. If the announcement message specifies that a reply message is desired, an announcement message is sent to the sending server that describes the current policy. When policy installation is complete, the secondary server transitions from install policy state 940 back to wait for event state 920, as depicted by arrow 944.

The secondary server leaves wait for event state 920 if the dead primary timer pops or the re-evaluate role timer pops, as depicted by arrow 926. The dead primary timer pops when the primary server has been non-responsive for more than a specified length of time, while the re-evaluate role timer pops when a specified amount of time has passed after the secondary server has determined that the secondary server should become the primary server. Delaying the actual move from secondary server to primary server allows time to receive announcement messages from other secondary servers that are also planning to change role to become the primary server, and if such messages are received, the secondary server can re-evaluate whether the change to become the primary server is still appropriate (e.g., whether that secondary server has the highest priority among the servers that are planning on becoming the primary server). If the secondary server determines that changing role to become the primary server is not appropriate, the primary periodic timer and the dead periodic timers are reset.

Arrow 926 leads to evaluate role state 950. If evaluate role state 950 is reached because the dead primary timer pops, the primary server is removed from the list of known peer servers. If the resulting list of peers shows another peer that is designated as the primary server, then the secondary server determines that changing role to become the primary server is not appropriate, and the primary periodic timer and dead primary timer are reset. However, if no other server is designated as the primary server, the secondary server identifies the secondary server with the highest priority and updates the local state to show that that secondary server as the primary server. In either case, the secondary server has determined to stay in the secondary role and returns to the wait for event state 920, as depicted by arrow 952.

However, if in evaluate role state 950, the secondary server determines that the priority of the secondary server is higher than the priority of any other secondary server, then the secondary server sends an announcement to the other servers that the secondary serve is the primary server. But the secondary server only resets the re-evaluate role timer and will remain in the secondary role, as depicted by arrow 952, and then returns to the wait for event state 920. When the re-evaluate role timer pops, as depicted by arrow 926, the secondary server returns to evaluate role state 950. Here the peer list is checked again to determine if another secondary server with a higher priority has announced a change to become the primary server, as described above.

Figure 10:
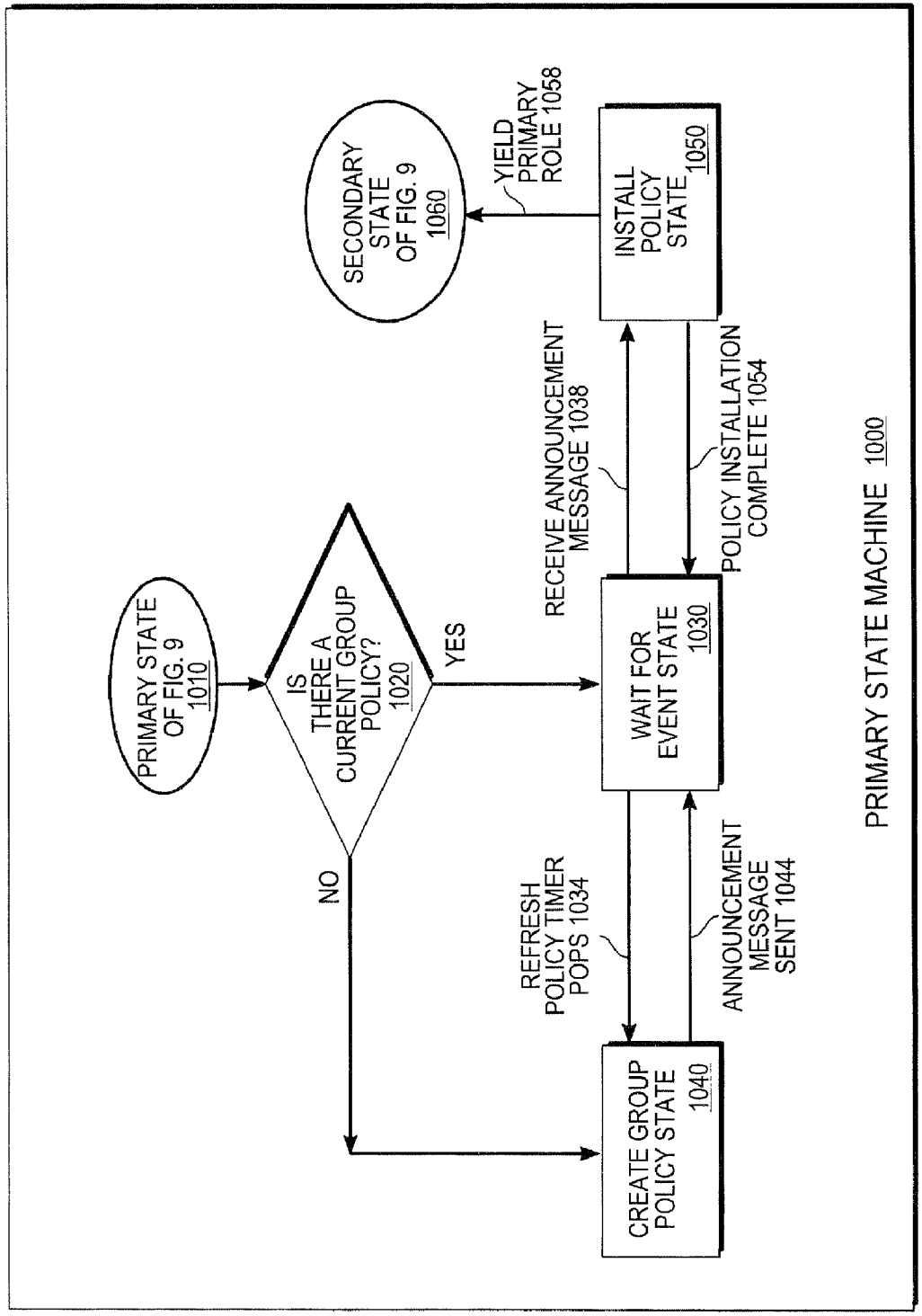
FIG. 10 is a block diagram depicting an example of a primary state machine, according to an embodiment.

If after the expiration of the re-evaluate role timer, the secondary server determines that changing role from secondary to primary is appropriate because the secondary server is either the only server that has announced becoming the primary server or is the server with the highest priority among those announcing becoming the primary server, the secondary server decides to switch to assume the primary role, as depicted by arrow 954, resulting in the server entering the primary state machine 1000 of FIG. 10, as depicted by oval 960.

However, if after the expiration of the re-evaluate role timer, the secondary server determines that another server should become the primary server, the secondary server decides to change role back to being a secondary server, resets the primary periodic timer and the dead primary timer, and then returns to wait for event state 920.

Although not depicted in FIG. 9, a secondary server can enter the primary state at the request of the system administrator, in which case the secondary state machine 900 transitions from the wait for event state 920 to the evaluate role state 950 and then on to switching to the primary role as depicted by oval 960, without the need to wait for a timer to pop or to evaluate whether the secondary servers' role should be changed. At the same time, if a server is currently designated as the primary server, then that primary server changes back to being the secondary server to avoid having two primary servers, although such a transition is also not depicted in either FIG. 9 or FIG. 10.

8.5 Primary State Machine

FIG. 10 is a block diagram depicting an example of a primary state machine 1000, according to an embodiment. Primary state machine 1000 beings with entry into the primary state as indicated by oval 1010, which can be reached from oval 960 of the secondary state machine 900 of FIG. 9.

Primary state machine 1000 then determines whether there is a current group policy in block 1020. If so, then the primary server enters the wait for event state 1030. If not, then the primary server proceeds to the create group policy state 1040. For example, if primary state machine 1000 was entered previously by another server that subsequently failed or was rendered unavailable due to a network partition, current group policy would typically still be in use, so the primary server enters wait for event state 1030. However, if the primary state machine 1000 is being entered into for the first time, then there is no existing group policy and the primary server must first create policy for the group, as discussed below for create group policy state 1040.

Any of several events can cause the primary server to leave wait for event state 1030, following which the primary server re-enters wait for event state 1030, except when the primary server determines that the primary server's role should change to become a secondary server.

The primary server leaves wait for event state 1030 if the refresh policy timer pops, as indicated by arrow 1034. The refresh policy timer pops on a regular basis, since the SA and keys expire after a specified amount of time. Typically, the refresh policy timer is set to pop prior to the expiration of the SA and keys so that the primary server can create new policy and distribute the new policy prior to the expiration of the current policy.

Arrow 1034 leads to create group policy state 1040, where the primary server enters the create group policy state. Recall that create group policy state 1040 is also reached from block 1020 when primary state machine 1000 is entered for the first time. Here the primary server generates any needed GDOI and/or IPsec policy and associated keys, and then the primary server includes the new policy in an announcement message that is sent to the secondary servers, as depicted by arrow 1044, following which the primary server returns to wait for event state 1030.

The primary server also leaves wait for event state 1030 when the primary server receives an announcement message, as depicted by arrow 1038, following which the primary server enters the install policy state 1050. If a request for a reply message is specified in the announcement message that is received, the primary server sends an announcement message with the current policy that is known by the primary server. Also, if the announcement message includes policy information, the primary server's policy databases are updated with the new policy information (e.g., new per-user LKH keys).

After the policy items are handled, the primary server decides whether to remain as the primary server and return to the wait for event state 1030, or whether to yield the primary role, as depicted by arrow 1058, and therefore change back to secondary state machine 900 of FIG. 9, as depicted by oval 1060. For example, if the announcement message indicates that the peer server from which the announcement message is received is also designated as the primary server, then primary state machine 1000 compares priority information. If the other server has a lower priority, the primary server returns to wait for event state 1030, since the other server with the lower priority should change back to being a secondary server.

However, if the other server has a higher priority, then the primary state machine 1000 sends an announcement message with the current policy so that the other primary server has the current policy, and then the current primary server yields the primary role, as depicted by arrow 1058, and changes role back to being a secondary server.

9.0 Implementation Mechanisms and Hardware Overview

The approach for managing state information by a group of servers that services a group of clients described herein may be implemented in a variety of ways and the invention is not limited to any particular implementation. The approach may be integrated into a network system or a router device, or may be implemented as a stand-alone mechanism. Furthermore, the approach may be implemented in computer software, hardware, or a combination thereof.

Figure 11:
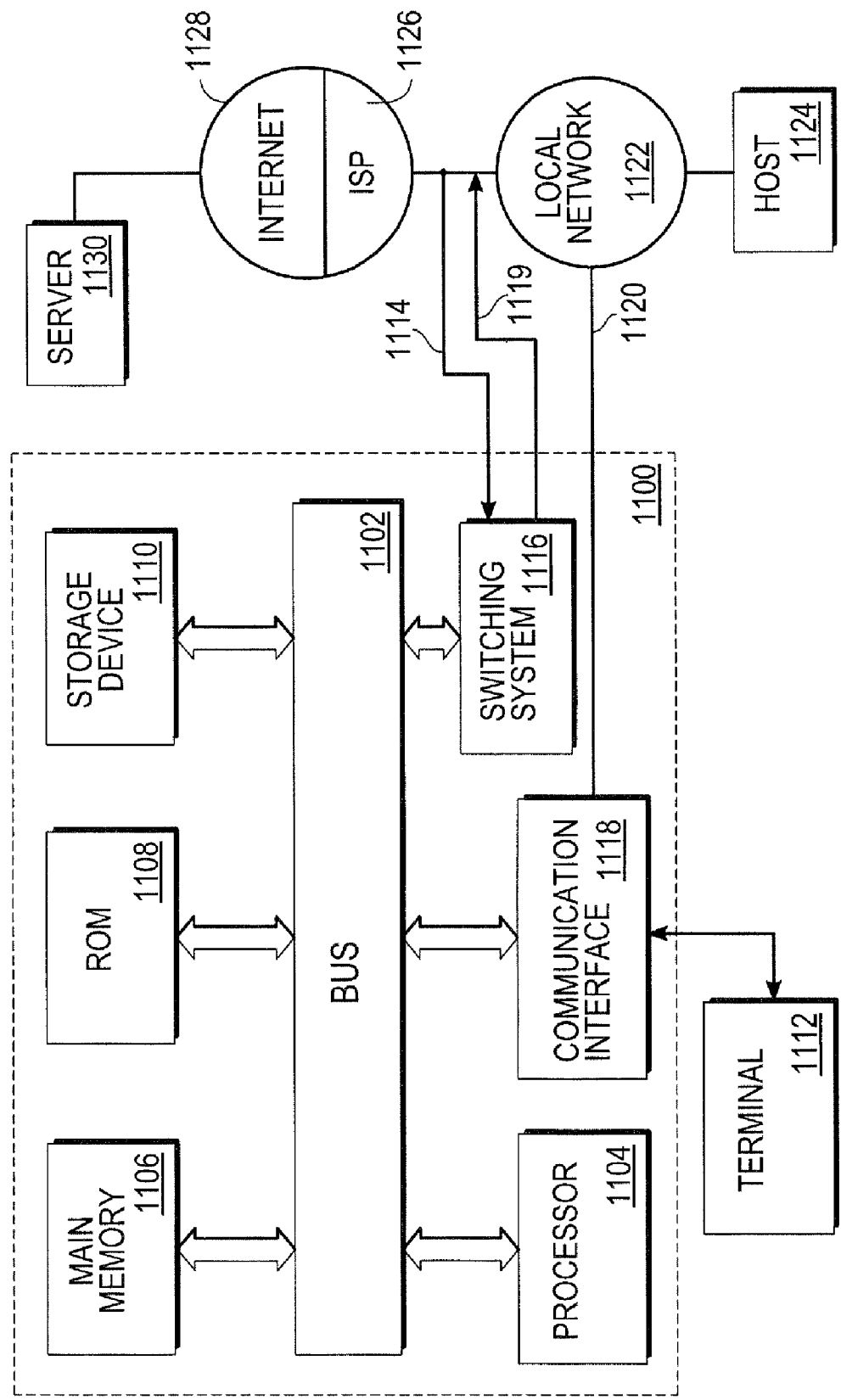
FIG. 11 is a block diagram that depicts a computer system upon which embodiments of the invention may be implemented.

FIG. 11 is a block diagram that illustrates a computer system 1100 upon which an embodiment of the invention may be implemented. The preferred embodiment is implemented using one or more computer programs running on a network element such as a router device. Thus, in this embodiment, the computer system 1100 is a router.

Computer system 1100 includes a bus 1102 or other communication mechanism for communicating information, and a processor 1104 coupled with bus 1102 for processing information. Computer system 1100 also includes a main memory 1106, such as a random access memory (RAM), flash memory, or other dynamic storage device, coupled to bus 1102 for storing information and instructions to be executed by processor 1104. Main memory 1106 also may be used for storing temporary variables or other intermediate information during execution of instructions to be executed by processor 1104. Computer system 1100 further includes a read only memory (ROM) 1108 or other static storage device coupled to bus 1102 for storing static information and instructions for processor 1104. A storage device 1110, such as a magnetic disk, flash memory or optical disk, is provided and coupled to bus 1102 for storing information and instructions.

A communication interface 1118 may be coupled to bus 1102 for communicating information and command selections to processor 1104. Communication interface 1118 is a conventional serial interface such as an RS-232 or RS-422 interface. An external terminal 1112 or other computer system connects to the computer system 1100 and provides commands to it using the interface 1114. Firmware or software running in the computer system 1100 provides a terminal interface or character-based command interface so that external commands can be given to the computer system.

A switching system 1116 is coupled to bus 1102 and has an input interface 1114 and an output interface 1119 to one or more external network elements. The external network elements may include a local network 1122 coupled to one or more host computers 1124, or a global network such as Internet 1128 having one or more servers 1130. The switching system 1116 switches information traffic arriving on input interface 1114 to output interface 1119 according to predetermined protocols and conventions that are well known. For example, switching system 1116, in cooperation with processor 1104, can determine a destination of a packet of data arriving on input interface 1114 and send it to the correct destination using output interface 1119. The destinations may include host computer 1124, server 1130, other end stations, or other routing and switching devices in local network 1122 or Internet 1128.

The invention is related to the use of computer system 1100 for managing state information by a group of servers that services a group of clients. According to one embodiment of the invention, a method and apparatus for managing state information by a group of servers that services a group of clients are provided by computer system 1100 in response to processor 1104 executing one or more sequences of one or more instructions contained in main memory 1106. Such instructions may be read into main memory 1106 from another machine-readable medium, such as storage device

1110. Execution of the sequences of instructions contained in main memory 1106 causes processor 1104 to perform the process steps described herein. One or more processors in a multi-processing arrangement may also be employed to execute the sequences of instructions contained in main memory 1106. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing instructions to processor 1104 for execution. Such a medium may take many forms, including but not limited to, non-volatile media, volatile media, and transmission media. Non-volatile media includes, for example, optical or magnetic disks, such as storage device 1110. Volatile media includes dynamic memory, such as main memory 1106. Transmission media includes coaxial cables, copper wire and fiber optics, including the wires that comprise bus 1102. Transmission media can also take the form of acoustic or light waves, such as those generated during radio wave and infrared data communications.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 1104 for execution. For example, the instructions may initially be carried on a magnetic disk of a remote computer. The remote computer can load the instructions into its dynamic memory and send the instructions over a telephone line using a modem. A modem local to computer system 1100 can receive the data on the telephone line and use an infrared transmitter to convert the data to an infrared signal. An infrared detector coupled to bus 1102 can receive the data carried in the infrared signal and place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Communication interface 1118 also provides a two-way data communication coupling to a network link 1120 that is connected to a local network 1122. For example, communication interface 1118 may be an integrated services digital network (ISDN) card or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the worldwide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are exemplary forms of carrier waves transporting the information.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118. In accordance with the invention, one such downloaded application provides for managing state information by a group of servers that services a group of clients as described herein.

The received code may be executed by processor 1104 as it is received, and/or stored in storage device 1110, or other non-volatile storage for later execution. In this manner, computer system 1100 may obtain application code in the form of a carrier wave.

10.0 Extensions and Alternatives

In the foregoing description, the invention has been described with reference to specific embodiments thereof. It will, however, be evident that various modifications and changes may be made thereto without departing from the broader spirit and scope of the invention. For example, although examples have illustrated the use of security associations and group keys in conjunction with GDOI and IPsec in the context of a secure multicast group, the use of such examples of objects that are part of the state information for use by the servers and clients are used for explanation purposes only, and embodiments of the invention are not limited to any particular type of object that is included in the state information for use by the servers and the clients. Thus, the specification and drawings are, accordingly, to be regarded in an illustrative rather than a restrictive sense. The invention includes other contexts and applications in which the mechanisms and processes described herein are available to other mechanisms, methods, programs, and processes.

For example, the techniques described herein can be applied to a protocol for providing security alerts or for policy updates to network devices such as routers and firewalls. For example, an alert may consist of a security gateway determining that there is an ongoing attack against the network on port "X," as in a distributed denial of service (DDOS) attack. Therefore, the alert is like an IPsec policy that is to be distributed by multiple group servers, including one primary group server and one or more secondary group servers, to all other security gateways in the network to shut down port "X." After the DDOS attack is over, the primary group server deletes the alert, and the alert deletion is passed on to the security gateways in the network by the primary group server and the secondary group servers, as in the examples above in which new policy is transmitted via a rekey message.

In addition, in this description, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps. Furthermore, other embodiments may use more or fewer steps than those discussed herein.

What is claimed is:

1. A non-transitory machine-readable medium storing one or more sequences of instructions which, when executed by one or more processors, causes the one or more processors to perform:

electronically causing one server of a first group of data processing servers to be designated as a primary server that generates the state information to be used by both the first group of data processing servers and a second group of clients;

wherein the state information supports communication between clients in the second group of clients according to a network security protocol;

electronically causing the remaining servers of the first group of data processing servers to be designated as secondary servers that receive the state information from the primary server and provide the state information to clients, wherein the secondary servers do not generate the state information; and in response to detecting that the primary server cannot communicate with at least one secondary server, electronically causing one of the secondary servers to be designated as the primary server that generates additional state information to be used by both the first group of data processing servers and the second group of clients.

2. A non-transitory machine-readable medium as recited in claim 1, wherein, when the one or more sequences of instructions are executed by the one or more processors:

the primary server distributes the state information to the secondary servers;

the primary server and the secondary servers are capable of adding or removing a client from the group of clients; and the primary server and the secondary servers are capable of distributing the state information to any client of the group of clients that contacts the primary server or one of the secondary servers.

3. A non-transitory machine-readable medium as recited in claim 1, wherein, when the one or more sequences of instructions are executed by the one or more processors, electronically causing one of the secondary servers to be designated as the primary server that generates additional state information comprises:

electronically causing first priority information for a first secondary server and second priority information for a second secondary server to be compared; and based on the first priority information indicating a higher priority than the second priority information, electronically causing the first secondary server to be designated as the primary server.

4. A non-transitory machine-readable medium as recited in claim 1, wherein, when the one or more sequences of instructions are executed by the one or more processors:

the primary server not being able to communicate with said at least one secondary server further includes the primary server not being able to communicate with a first subgroup of secondary servers of the first group of data processing servers and a second subgroup of clients of the second group of clients, wherein the first subgroup of secondary servers includes the at least one secondary server; and said one of the secondary servers that is designated as the primary server generates the additional state information to be used by both the first subgroup of servers and the second subgroup of clients.

5. A non-transitory machine-readable medium as recited in claim 4, wherein, when the one or more sequences of instructions are executed by one or more processors:

the primary server that is not able to communicate with the first subgroup of secondary servers and the second subgroup of clients is a first primary server;

said one of the secondary servers that is designated as the primary server that generates the additional state information is a second primary server; and the first primary server is still able to communicate with a third subgroup of secondary servers of the first group of data processing servers and a fourth subgroup of clients of the second group of clients, wherein the third subgroup of secondary servers does not include the second primary server.

6. A non-transitory machine-readable medium as recited in claim 5, wherein the one or more sequences of instructions, when executed by the one or more processors, further causes the one or more processors to perform:

when the first primary server is again able to communicate with the first subgroup of secondary servers and the second subgroup of clients, electronically causing first state information from the first primary server and second state information from the second primary server to be synchronized;

electronically causing one primary server from among the first primary server and the second primary server to be designated as the primary server that generates additional state information for both the first group of data processing servers and the second group of clients; and electronically causing the other primary server from among the first primary server and the second primary server to be designated as a secondary server.

7. A non-transitory machine-readable medium as recited in claim 1, wherein, when the one or more sequences of instructions are executed by one or more processors:

each client of the second group of clients includes an ordered listing of the servers in the first group of data processing servers;

each client selects a particular server of the second group of servers to obtain state information from based on the ordered listing;

the ordered listings for the clients are arranged so that requests from the clients of the second group of clients are distributed among the servers of the first group of data processing servers; and the primary server is the only server among the first group of data processing servers to be designated as the primary server.

8. A non-transitory machine-readable medium as recited in claim 1, wherein, when the one or more sequences of instructions are executed by one or more processors:

the state information and the additional state information each include one or more objects;

the primary server can create new objects and destroy existing objects but cannot modify existing objects;

the primary server and each secondary server are active servers;

the primary server is a master server and each secondary server is a slave server;

each server in the first group of data processing servers is included in a different local area network (LAN);

the state information and the additional state information include one or more security associations that are based on Internet Protocol Security (IPsec);

the first group of data processing servers uses a group key management system based on Group Domain of Interpretation (GDOI); and the first group of data processing servers provides IPsec keys to the second group of clients based on GDOI as part of a feature selected from the group consisting of a secure multicast feature and a group virtual private network (VPN) feature.

9. A non-transitory machine-readable medium storing one or more sequences of instructions which, when executed by one or more processors, cause the one or more processors to manage state information to be used by a first group of data processing servers and a second group of clients by performing:

electronically receiving the state information from a first server at a second server, wherein:

the first server is included in the first group of data processing servers and is responsible for generating the state information;

the second server is included in the first group of data processing servers and is responsible for providing the state information to clients in the second group of clients, but is not responsible for generating the state information;

the state information is to be used by both the first group of data processing servers and the second group of clients;

wherein the state information supports communication between clients in the second group of clients according to a network security protocol;

the second server electronically detecting that the first server is not able to communicate with the second server;

in response to said detecting, the second server determining that the second server should be responsible for generating the state information in place of the first server; and the second server generating the state information.

10. A non-transitory machine-readable medium as recited in claim 9, wherein the one or more sequences of instructions, when executed by the one or more processors, further causes the one or more processors to perform:

the second server detecting that the first server is again able to communicate with the second server;

the second server sending first state information to the first server;

the second server receiving second state information from the first server;

the second server generating third state information by synchronizing the first state information and the second state information;

the second server providing priority information to the first server; and the second server receiving designation information from the first server that indicates that the first server is not responsible for generating the state information.

11. A non-transitory machine-readable medium as recited in claim 9, wherein, when the one or more sequences of instructions are executed by one or more processors:

prior to the second server detecting that the first server is not able to communicate with the second server, the first server is designated as a primary server and the second server is designated as a secondary server;

after the second server determines that the second server should be responsible for generating the state information in place of the first server, the second server is designated as the primary server; and detecting that the first server is not able to communicate with the second server further comprises:

the second server determining that no messages from the first server have been received within a first specified period of time; and the second server determining that the first server fails to respond within a second specified period of time to a message sent from the second server to the first server.

12. A non-transitory machine-readable medium as recited in claim 9, wherein, when the one or more sequences of instructions are executed by one or more processors:

the state information includes one or more group keys to be used for encrypting and decrypting communications among the second group of clients and between the first group of data processing servers and the second group of clients according to the Internet Protocol Security (IPsec);

the first server receiving the state information from the first server includes the first server receiving the one or more group keys from the second server;

the second server generating the state information includes:

the second server generating at least one additional group key; and the second server communicating the at least one additional group key to the second group of clients using a rekey message.

\* \* \* \* \*